(12) United States Patent
Yao et al.

(10) Patent No.: US 10,456,704 B2
(45) Date of Patent: Oct. 29, 2019

(54) METHOD OF REAL-TIME PROGNOSIS OF FLOODING PHENOMENON IN PACKED COLUMN

(71) Applicants: NATIONAL TSING HUA UNIVERSITY, Hsinchu (TW); Chang Chun Plastics Co., Ltd., Taipei (TW); Chang Chun Petrochemical Co., LTD., Taipei (TW)

(72) Inventors: Yuan Yao, Hsinchu (TW); Bo-Fan Hseuh, Hsinchu (TW)

(73) Assignees: NATIONAL TSING HUA UNIVERSITY, Hsinchu (TW); Chang Chun Plastics Co., Ltd., Taipei (TW); Chang Chun Petrochemical Co., LTD., Taipei (TW)

( * ) Notice: Subject to any disclaimer, the term of this patent is extended or adjusted under 35 U.S.C. 154(b) by 239 days.

(21) Appl. No.: 15/795,278

(22) Filed: Oct. 27, 2017

(65) Prior Publication Data

US 2018/0264376 A1 Sep. 20, 2018

(30) Foreign Application Priority Data

Mar. 14, 2017 (TW) .............. 106108392 A

(51) Int. Cl.
*B01D 3/42* (2006.01)
*G05B 15/02* (2006.01)
(Continued)

(52) U.S. Cl.
CPC ............ *B01D 3/4211* (2013.01); *G05B 15/02* (2013.01); *G05D 16/20* (2013.01); *G06F 17/12* (2013.01)

(58) Field of Classification Search
CPC .................................................. B01D 3/4211
See application file for complete search history.

(56) References Cited

U.S. PATENT DOCUMENTS 4,511,435 A 4/1985 Strohschein
6,891,061 B1 5/2005 Nishimura et al.

FOREIGN PATENT DOCUMENTS

CN 102539523 A 7/2012
CN 101765454 B 7/2013
(Continued)

OTHER PUBLICATIONS

English Translation of CN104359503, 2015. (Year: 2015).*

(Continued)

*Primary Examiner* — Matthew D Krcha
(74) *Attorney, Agent, or Firm* — CKC & Partners Co., LLC

(57) ABSTRACT

A method of real-time prognosis of a flooding phenomenon in a packed column includes steps as follows. An online data collection step is conducted, wherein a plurality of values of a pressure drop are collected from the packed column under operation. A detrending step is conducted to obtain a plurality of values of a detrended pressure drop. A fitting step is conducted, wherein the values of the detrended pressure drop are fitted with an EGARCH(p, q) model to obtain a value of at least one of model coefficients. A repeat step is conducted to obtain another value of the at least one of model coefficients. A statistical step is conducted, wherein a value of the monitoring statistic is calculated. A control step is conducted, wherein the value of the monitoring statistic is compared to a control limit.

19 Claims, 18 Drawing Sheets

(51) Int. Cl.
  *G05D 16/20* (2006.01)
  *G06F 17/12* (2006.01)

(56) References Cited

FOREIGN PATENT DOCUMENTS

| | | | |
|---|---|---|---|
| CN | 104359503 A | * | 2/2015 |
| CN | 104359503 A | | 2/2015 |
| EP | 0995958 A2 | | 4/2000 |

OTHER PUBLICATIONS

D. B. Nelson, "Conditional Heteroskedasticity in Asset Returns: A New Approach", Econometrica, vol. 59, issue 2, pp. 347-370, published on Mar. 1991, published by The Econometric Society. (Year: 1991).*

T. K. Sherwood et al., "Flooding Velocities in Packed Columns", Industrial & Engineering Chemistry, vol. 30, issue 7, pp. 765-769, published on Jul. 1, 1938, published by American Chemical Society, United States.

J. C. Elgin et al., "Liquid Holdup and Flooding in Packed Towers", Industrial & Engineering Chemistry, vol. 31, issue 4, pp. 435-445, published on Apr. 1, 1939, published by American Chemical Society, United States.

Sanjay Parthasarathy et al., "Prediction of Flooding in an Absorption Column using Neural Networks", Proceedings of the 1999 IEEE International Conference on Control Applications, dated on Aug. 22-27, 1999, vol. 2, pp. 1056-1061, United States.

Vladimir Jiřičný et al., "Experimental Study of the Flooding and Appearance of a Bubble Bed on Top of a Countercurrent Packed-Bed Column", Industrial & Engineering Chemistry Research, vol. 40, issue 1, pp. 407-412, published on Jan. 10, 2001, published by American Chemical Society, United States.

Erin Hansuld et al., "Acoustic detection of flooding in absorption columns and trickle beds", Chemical Engineering and Processing: Process Intensification, vol. 47, issue 5, pp. 871-878, published in May 2008, published by Elsevier B.V., Netherlands.

* cited by examiner

METHOD OF REAL-TIME PROGNOSIS OF FLOODING PHENOMENON IN PACKED COLUMN

RELATED APPLICATIONS

This application claims priority to Taiwan Application Serial Number 106108392, filed Mar. 14, 2017, which is herein incorporated by reference.

BACKGROUND

Technical Field

The present disclosure relates to a method of real-time prognosis of a flooding phenomenon in a packed column. More particularly, the present disclosure relates to a method of real-time prognosis of a flooding phenomenon in a packed column which adopts a statistical process control (SPC) method.

Description of Related Art

In chemical industries, a packed column is a separation apparatus utilized in a gas-liquid system. The packed column is capable to achieve high mass transfer rates even in the situations of strong flow fluctuations and relatively low pressure drop, and thus is widely used. However, when a relative flow rate of a gas and a liquid exceeds an extreme limit, the pressure drop in the packed column increases sharply, which hinders the liquid from flowing downwardly. Instead, the liquid spills out from the top of the packed column, which is a common error of the packed column and is called a flooding phenomenon. The flooding phenomenon lowers the purity of the products, interferes the normal operation of process, and even shuts down the entire production line which results in a huge loss.

In general, the higher the gas flow rate and/or the liquid flow rate, the higher the operational efficiency can be obtained. In other words, the packed column can reach the highest efficiency when the operational condition is close to the flooding point (the critical gas flow rate at which the flooding phenomenon occurs). However, in practice, the gas flow rate is conservatively set at about 0.6 to 0.8 of the flooding point for the sake of safety. The flooding phenomenon can be prevented effectively, but drawbacks, such as low production rate and high energy consumption, are results. How to precisely predict or judge the flooding point for both high efficiency and operational safety is the goal of relevant industry.

The conventional methods for predicting or judging the flooding point adopt empirical correlations and models, and the prediction accuracy thereof depends on empirical parameters related to the packed column under consideration. However, different packed columns have different empirical parameters. It is difficult to obtain the empirical parameters when the design of the packed column is unknown. Considering the fact that numerous types of the packed columns are used in industry, it is difficult to obtain the empirical parameters of all the packed columns. Also, the existing empirical parameters obtained from a specific packed column are hardly adequate for other packed columns. Consequently, the conventional methods for predicting or judging the flooding point by adopting empirical correlations and models cannot predict the flooding point precisely.

For avoiding the drawbacks of the empirical correlations and models which require a large number of history data, methods of real-time monitoring are developed. The most direct method for real-time monitoring is visual inspection, i.e., observing the heaping phenomenon of liquid upon the surface of packings via human eyes. However, visual inspection only can be applied to the packed column with transparent column body. Moreover, delay is also a problem. When the flooding phenomenon is observed by human eyes, the error has already occurred. Even if the operational conditions of the packed column are adjusted immediately, it still requires a period of time for the process to return to normal.

Other methods of real-time prognosis of flooding point were developed. The process variables, such as pressure drops, flow rates and temperatures, can be measured in real time via sensing and transmitting elements. A plenty of process information can be obtained by analyzing the measured data of the process variables, which represents the status of operational conditions. If the operational status can be recognized from the process information, a proper adjustment can be made before or at the moment that the error occurs. Accordingly, unnecessary loss can be avoided. For example, Dzyacky monitors a plurality of process variables, such as temperatures, pressure drops and flow rates, and a threshold value of each of the process variables corresponding to normal condition is set. When multiple process variables are greater than the threshold values, the possibility of flooding phenomenon is asserted. However, with the change of the flow rate, it is difficult to establish accurate threshold values. Moreover, if the correlations between different process variables are neglected, Type I errors may occur. In another example, Hansuld et al. discloses a method of real-time prognosis of flooding point by measuring acoustic wave signals. Specifically, a plurality of receptors of the acoustic wave signals are installed on the external surface of the column body for collecting the acoustic wave signals of the liquid inside the packed column. The flooding point is detected by analyzing the change of the acoustic wave signals. Although the method can assist the engineer to judge the operational status inside the packed column, there still lacks effective SPC methods to determine a control limit. The definitions of the operational status and the threshold values are still dependent on human decisions.

Given the above, the developed methods for prognosis of flooding point have drawbacks of requiring a number of empirical parameters to establish the model, lacking of the necessary ability of providing accurate judgement, excessively depending on human decisions, lacking of the necessary ability of being applied to all types of packed columns or requiring invasively modifying the packed column, and thus can hardly be used in industry. Therefore, there still needs a method of real-time prognosis of flooding point which has advantages of being capable of being applied to all types of packed columns and providing accurate judgement, and not depending on human decisions.

SUMMARY

According to one aspect of the present disclosure, a method of real-time prognosis of a flooding phenomenon in a packed column includes steps as follows. An online data collection step is conducted, wherein a plurality of values of a pressure drop are collected from the packed column under operation. A detrending step is conducted, wherein a trend of the values of the pressure drop is removed to obtain a plurality of values of a detrended pressure drop. A fitting step is conducted, wherein the values of the detrended pressure drop are fitted with an exponential generalized autoregressive conditional heteroskedasticity model with orders of p and q (EGARCH(p, q) model) to obtain a value of at least one of model coefficients. A repeat step is conducted, wherein another value of the at least one of model coefficients is obtained. A statistical step is conducted, wherein a value of a monitoring statistic is calculated based on the values of the at least one of model coefficients. A control step is conducted, wherein the value of the monitoring statistic is compared to a control limit, and an alarm is triggered when the value of the monitoring statistic is greater than the control limit.

According to another aspect of the present disclosure, a method of real-time prognosis of a flooding phenomenon in a packed column includes steps as follows. An online data collection step is conducted, wherein a plurality of values of a pressure drop are collected from the packed column under operation. A detrending step is conducted, wherein a trend of the values of the pressure drop is removed to obtain a plurality of values of a detrended pressure drop. A fitting step is conducted, wherein the values of the detrended pressure drop are fitted with an EGARCH(p, q) model to obtain a value of at least one of model coefficients. A control step is conducted, wherein the value of at least one of model coefficients is compared to a control limit, and an alarm is triggered when the value of at least one of model coefficients is greater than the control limit.

BRIEF DESCRIPTION OF THE DRAWINGS

The present disclosure can be more fully understood by reading the following detailed description of the embodiments, with reference made to the accompanying drawings as follows.

DETAILED DESCRIPTION

According to the present disclosure, different algorithms/formulas may use identical symbols, and the definitions of the identical symbols may be same or different. The definition of each of the symbols is defined by its corresponding algorithm/formula.

According to the present disclosure, the term "pressure drop" is a noun, and a value of the pressure drop is numerical value for describing the quantity of the pressure drop.

According to the present disclosure, the term "detrended pressure drop" is a noun, and a value of the detrended pressure drop is numerical value for describing the quantity of the detrended pressure drop.

According to the present disclosure, the term "monitoring statistic" is a noun, and a value of the monitoring statistic is numerical value for describing the quantity of the monitoring statistic.

According to the present disclosure, the term "model coefficient" is a noun, and a value of the model coefficient is numerical value for describing the quantity of the model coefficient.

Figure 1:
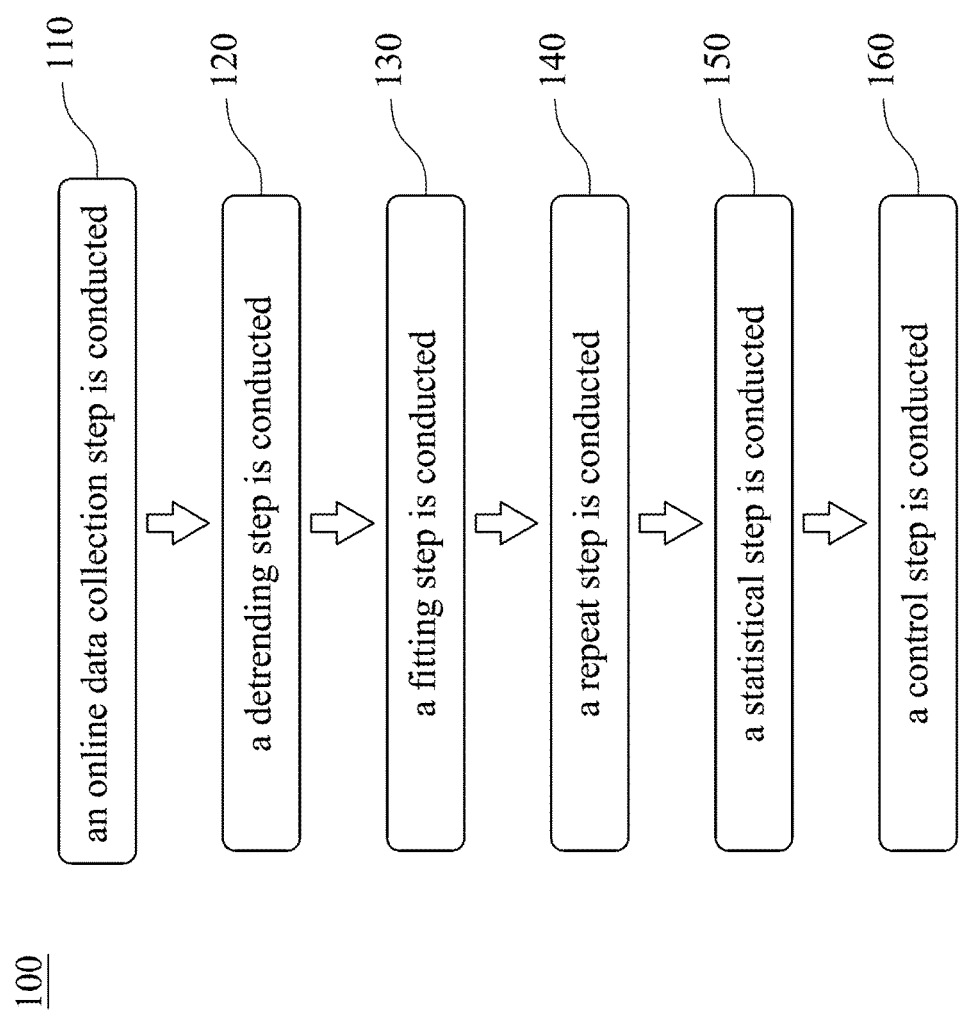
FIG. 1 is a flow diagram showing a method of real-time prognosis of a flooding phenomenon in a packed column according to one embodiment of the present disclosure.

FIG. 1 is a flow diagram showing a method of real-time prognosis of a flooding phenomenon in a packed column 100 according to one embodiment of the present disclosure. In FIG. 1, the method of real-time prognosis of the flooding phenomenon in the packed column 100 includes Step 110, Step 120, Step 130, Step 140, Step 150 and Step 160.

In Step 110, an online data collection step is conducted, wherein a plurality of values of a pressure drop are collected from the packed column under operation. Specifically, the values of the pressure drop are a time series of pressure drops. That is, the sampling interval of the values of the pressure drop is fixed, and the values of the pressure drop are arranged in chronological order. More specifically, at least one sensing and transmitting element can be installed in the packed column. The sensing and transmitting element is applied to measure the pressure drop in the packed column, i.e., the sensing and transmitting element is applied to measure values of the pressure drop in the packed column. Furthermore, the sensing and transmitting element can be connected with a computer (via a wired or wireless connection). Thus, the values of the pressure drop measured by the sensing and transmitting element can be delivered to the computer in real time, and can be recorded and calculated by the computer. Moreover, the packed column can further include a blower and a liquid pump. The blower can change a gas flow rate according to an instruction of the computer. Alternatively, the liquid pump can change a liquid flow rate according to the instruction of the computer. Alternatively, the blower can change a gas flow rate and the liquid pump can change a liquid flow rate simultaneously according to the instruction of the computer. For example, when an alarm is triggered, which represents the flooding phenomenon is going to happen, an instruction for reducing the gas flow rate of the packed column can be sent from the computer to the blower, and then the blower reduces the gas flow rate of the packed column according to the instruction. Accordingly, the flooding phenomenon can be prevented. The delivery of the data (i.e., the values of the pressure drop) and the instruction between the computer and the packed column, and the record and calculation of the data can be implemented by an input/output signal card and a corresponding software installed in the computer. For example, the input/output signal card can be, but is no limited to, NI PXI-8433/4 produced by the National Instruments Corporation, which can be coordinated with a corresponding software of LabVIEW produced by the National Instruments Corporation or a self-developed software based on C++ or another programming language.

In Step 120, a detrending step is conducted, wherein a trend of the values of the pressure drop is removed to obtain a plurality of values of a detrended pressure drop. According to one example of the present disclosure, the trend of the values of the pressure drop is a linear trend, and the linear trend is obtained by fitting the values of the pressure drop with a least square method. In other words, the linear trend is the best-fit line obtained by fitting the values of the pressure drop with the least square method. The values of the detrended pressure drop can be obtained simply by subtracting the best-fit line from the values of the pressure drop.

In Step 130, a fitting step is conducted, wherein the values of the detrended pressure drop are fitted with an EGARCH (p, q) model to obtain a value of at least one of model coefficients, wherein p and q are orders of the EGARCH(p, q) model. The EGARCH(p, q) model can be represented by Formula (1):

$$\ln(\sigma_t^2) = \alpha_0 + \sum_{i=1}^{p} \beta_i \log \sigma_{t-i}^2 + \sum_{j=1}^{q} \alpha_j \left[ \frac{|\varepsilon_{t-j}|}{\sigma_j} - E\left\{ \frac{|\varepsilon_{t-j}|}{\sigma_{t-j}} \right\} \right] + \sum_{j=1}^{q} \xi_j \left( \frac{\varepsilon_{t-j}}{\sigma_{t-j}} \right); \quad (1)$$

wherein t is a time point, $\sigma_t^2$ is a conditional variance of pressure drop at the time point of t, $\alpha_0$, $\beta_i$, $\alpha_j$ and $\xi_j$ are the model coefficients, $\varepsilon_{i-j}$ is a residual, i is an integer from 1 to p, and j is an integer from 1 to q. In other words, the values of the detrended pressure drop are fitted with the EGARCH (p, q) model, and the EGARCH(p, q) model of the values of the detrended pressure drop can be obtained with the corresponding values of the model coefficients, $\alpha_0$, $\beta_i$, $\alpha_j$ and $\xi_j$. At least one of the model coefficients, $\alpha_0$, $\beta_i$, $\alpha_j$ and $\xi_j$, whose values change significantly before and after the flooding phenomenon, is selected for monitoring. Therefore, it is unnecessary to monitor all the model coefficients. Only the model coefficients whose values change significantly before and after the flooding phenomenon are monitored. In other words, in the aforementioned phrase of "to obtain a value of at least one of model coefficients", the "at least one of model coefficients" refers to the model coefficient whose values change significantly before and after the flooding phenomenon. Moreover, the orders of the EGARCH(p, q) model, p and q, can be determined based on an Akaike information criterion (AIC) or a Bayesian information criterion (BIC). How to determine the orders of the EGARCH (p, q) model is conventional, and is not repeated herein. According to one example of the present disclosure, the p equals to 1, and the q equals to 1.

In Step 140, a repeat step is conducted, wherein Step 120 and Step 130 are repeated so as to obtain another value of the at least one of model coefficients. Step 140 can be repeated several times till the number of the values of the at least one of model coefficients is sufficient for the following calculation of the monitoring statistic.

In Step 150, a statistical step is conducted, wherein a value of the monitoring statistic is calculated based on the values of the at least one of model coefficients.

In Step 160, a control step is conducted, wherein the value of the monitoring statistic is compared to a control limit, and an alarm is triggered when the value of the monitoring statistic is greater than the control limit. Moreover, the value of the monitoring statistic and the control limit can be plotted in a control chart. Therefore, it is favorable to directly monitor the flooding phenomenon of the packed column in real-time via a graphic presentation. Step 110 to Step 160 can be repeated for continuously monitoring the flooding phenomenon in the packed column.

Specifically, Step 150 and Step 160 can be implemented by an SPC method. The SPC method is a statistical analysis method widely used in industry for monitoring the performance of a manufacturing process, wherein a control limit is determined by analyzing sample data, and the control limit is applied to judge the status of the manufacturing process. In the present disclosure, the values of the at least one of model coefficients are the sample data of the SPC method. In brief, in the method of real-time prognosis of the flooding phenomenon in the packed column 100, a plurality of values of the at least one of model coefficients are collected in advance (which can be the training sample set mentioned below), and the plurality of values of the at least one of model coefficients are analyzed to determine a control limit in advance. Afterward, the pre-determined control limit is applied to monitor the values of the at least one of model coefficients which are calculated online when the packed column under operation, so that the flooding phenomenon of the packed column can be monitored in real time. The following outlines how to calculate the value of the monitoring statistic from the values of the at least one of model coefficients and how to determine the control limit in advance with nonparametric SPC method using Mann-Whitney test (hereinafter, MW SPC method). The MW SPC method is an SPC method adopting the Mann-Whitney test.

The main idea of the MW SPC is as follows. Suppose that a training sample set (also called "reference data") of size m1, $R_X = (R_{X1}, R_{X2}, R_{X3}, \ldots R_{Xm1})$, is collected when the process is in control. In the present disclosure, $R_X$ refers m1 number of the values of the at least one of model coefficients which are calculated from the packed column under normal operation. The normal operation refers that the packed column is operated without the flooding phenomenon. Afterward, H sets of test samples are collected. Each of the test sample sets includes m2 number of test data points, and is expressed as $R_Y^h = (R_{Y1}^h, R_{Y2}^h, R_{Y3}^h, \ldots R_{Ym2}^h)$, wherein h denotes the set number, i.e., the hth test sample set. Furthermore, h is an integer from 1 to H. In the present disclosure, $R_Y^h$ refers m2 number of the values of the at least one of model coefficients which are calculated online when the packed column under operation (i.e., are obtained via Step 110, Step 120, Step 130 and Step 140). Then the value of the monitoring statistic can be calculated according to MW test (i.e., via Step 150). The value of the monitoring statistic can be calculated by Formula (2):

$$M_{X,Y}^h = \sum_{i=1}^{m1} \sum_{j=1}^{m2} I(R_{Xi} < R_{Yj}^h); \quad (2)$$

In Formula (2), $M_{X,Y}^h$ represents the monitoring statistic, $I(R_{Xi}<R_{Yj}^h)$ is an indicator function for the event of $\{R_{Xi}<R_{Yj}^h\}$. When $\{R_{Xi}<R_{Yj}^h\}$ is valid, $I(R_{Xi}<R_{Yj}^h)$ equals to 1. When $\{R_{Xi}<R_{Yj}^h\}$ is invalid, $I(R_{Xi}<R_{Yj}^h)$ equals to 0. Hence, $M_{X,Y}^h$ is a value between 0 and m1m2.

The value of the monitoring statistic $M_{X,Y}^h$ is compare to a control limit. When the value of the monitoring statistic $M_{X,Y}^h$ is greater than the control limit, which means the flooding phenomenon is happening or is going to happen, an alarm is triggered (i.e., Step 160).

Figure 2:
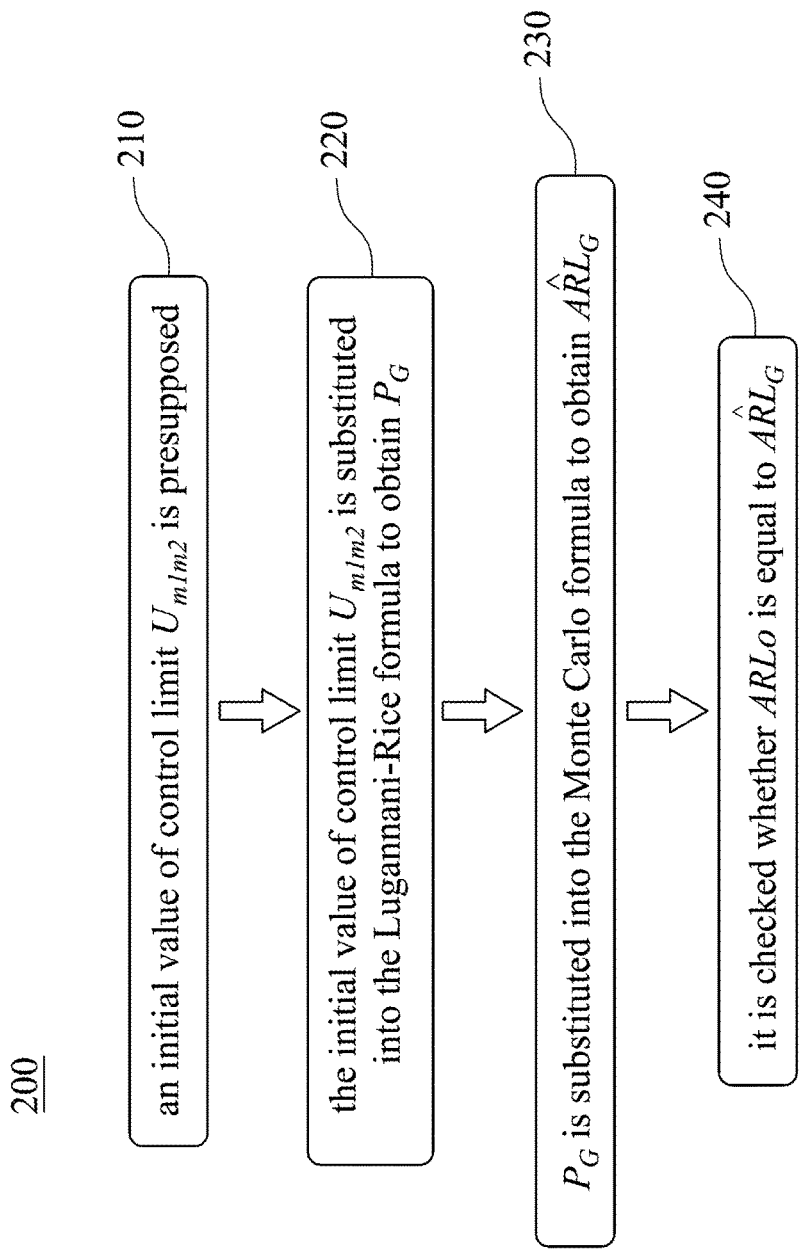
FIG. 2 is a flow diagram showing a method for determining a control limit of FIG. 1.

The control limit is determined before conducting the method of real-time prognosis of the flooding phenomenon in the packed column 100. The control limit is determined by choosing the average run length in control (ARLo), and 370 or 500 are most commonly chosen value for the ARLo. When the ARLo equals to 370, it means that probability of a false alarm is about 0.27% when the process status is normal. When the ARLo equals to 500, it means that probability of a false alarm is about 0.20% when the process status is normal. When the ARLo, the size of the training sample set m1 and the size of the test sample set m2 are given, the control limit can be determined by the iterative steps of a linear interpolation method. FIG. 2 is a flow diagram showing a method for determining the control limit 200 of FIG. 1. The method for determining the control limit 200 includes Step 210, Step 220, Step 230 and Step 240.

In Step 210, an initial value of control limit $U_{m1m2}$ is presupposed.

In Step 220, the initial value of control limit $U_{m1m2}$ is substituted into the Lugannani-Rice formula to obtain $P_G$, which is shown in Formula (3):

$$P_G(M_{X,Y}^h > U_{m1m2}) = \tag{3}$$
$$P_G(\overline{M_{X,Y}^h} > U_{m1m2}/m2) = P_G(\overline{M_{X,Y}^h} \geq \mu) \approx 1 - \Phi(r) + \varphi(r)\left(\frac{1}{\lambda} - \frac{1}{r}\right)$$
$$\lambda = m2^{1/2}(1-e^\gamma)\sigma(\gamma); \quad r = (sgn\gamma)\{2n(\gamma\mu - k(\gamma))\}^{1/2};$$

wherein $\gamma$ is a saddle point, $\phi(r)$ is a cumulative distribution function of r, and $\varphi(r)$ is a probability distribution function of r.

In Step 230, $P_G$ is substituted into the Monte Carlo formula to obtain $\hat{ARL}_G$, as shown in Formula (4):

$$\hat{ARL}_G \approx \frac{1}{K}\sum_{i=1}^{K}\frac{1}{P_G(X_i)}. \tag{4}$$

In Step 240, it is checked whether ARLo is equal to $\hat{ARL}_G$. When ARLo equals to $\hat{ARL}_G$, the presupposed initial value of the control limit $U_{m1m2}$ is set as the control limit pursued. When ARLo does not equal to $\hat{ARL}_G$, another $U_{m1m2}$ is presupposed and repeat Step 210 to Step 240 till the pursued control limit is obtained.

When ARLo=500 and the size of the test sample set m2=5, the control limits corresponding to different sizes of the training sample set m1 are listed in Table 1, which are the results of calculation.

TABLE 1

| m1 | control limit |
|---|---|
| 50 | 217 |
| 75 | 326 |
| 100 | 435 |
| 150 | 654 |
| 300 | 1304 |
| 500 | 2172 |
| 750 | 3258 |
| 1000 | 4347 |
| 1500 | 6520 |
| 2000 | 8691 |

That is, when ARLo=500, the size of the test sample set m2=5, and the desired size of the training sample set m1 is already recorded in Table 1, the control limit can be obtained simply by looking up Table 1.

In summary, when the MW SPC method is adopted, the values of ARLo, the size of the training sample set m1 and the size of the test sample set m2 are predetermined for determining the control limit in advance. Then the values of the pressure drop collected online are used to calculate a plurality of values of the at least one of model coefficients, followed by the calculation of the value of the monitoring statistic as in Formula (2). The value of the monitoring statistic is compared to the control limit. When the value of the monitoring statistic is greater than the control limit, an alarm is triggered. Furthermore, the size of the training sample set m1 should be selected properly, which allows to reflect the systematic variations in the values of the pressure drop when the packed column is under normal operation. The size of the test sample set m2 should give consideration to both the accuracy and the monitoring efficiency.

Figure 3:
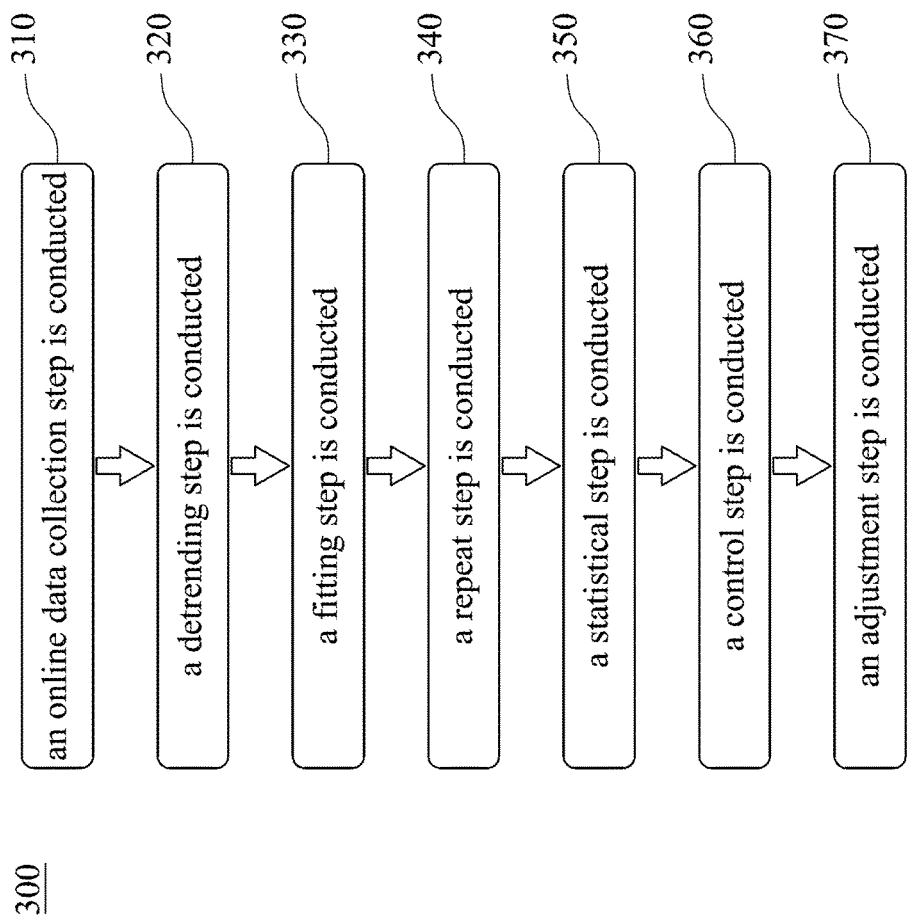
FIG. 3 is a flow diagram showing a method of real-time prognosis of a flooding phenomenon in a packed column according to another embodiment of the present disclosure.

FIG. 3 is a flow diagram showing a method of real-time prognosis of a flooding phenomenon in a packed column 300 according to another embodiment of the present disclosure. In FIG. 3, the method of real-time prognosis of the flooding phenomenon in the packed column 300 includes Step 310, Step 320, Step 330, Step 340, Step 350, Step 360 and Step 370.

In Step 310, an online data collection step is conducted. In Step 320, a detrending step is conducted. In Step 330, a fitting step is conducted. In Step 340, a repeat step is conducted. In Step 350, a statistical step is conducted. In Step 360, a control step is conducted. Details of Step 310 to Step 360 can be the same as that of Step 110 to Step 160, and are not repeated herein.

In Step 370, an adjustment step is conducted after the alarm is triggered, wherein an operational condition of the packed column is adjusted to make the value of the monitoring statistic less than the control limit. Specifically, the blower can change a gas flow rate or the liquid pump can change a liquid flow rate according to an instruction of the computer, or the blower can change the gas flow rate and the liquid pump can change the liquid flow rate simultaneously according to the instruction of the computer, whereby the flooding phenomenon can be prevented.

Figure 4:
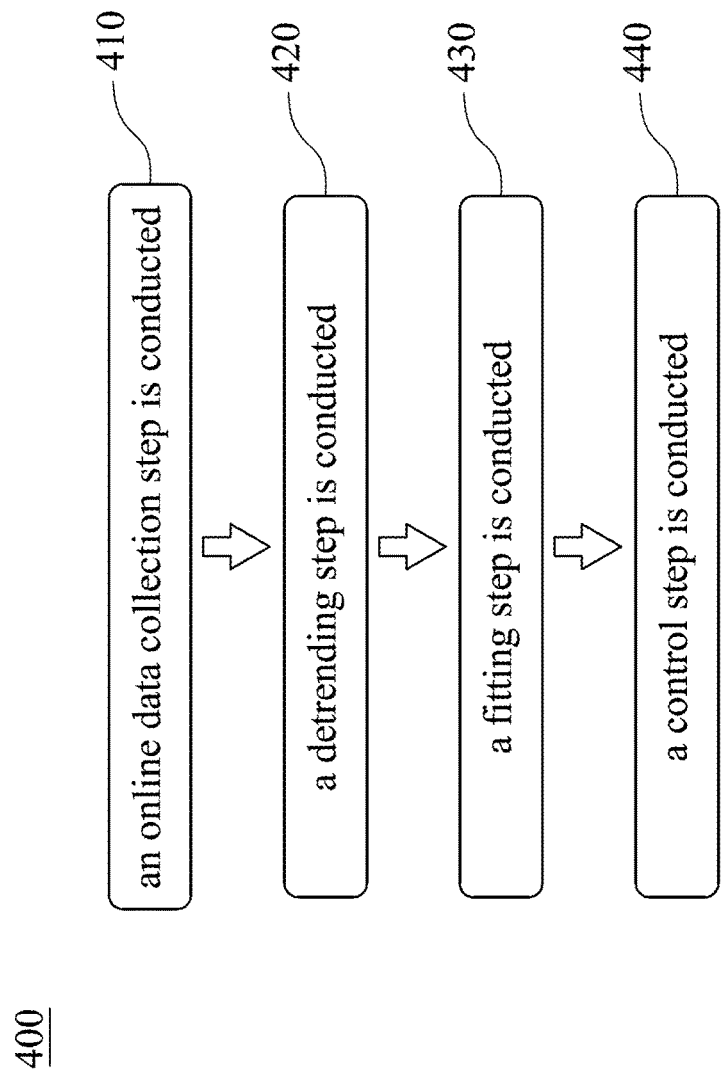
FIG. 4 is a flow diagram showing a method of real-time prognosis of a flooding phenomenon in a packed column according to yet another embodiment of the present disclosure.

FIG. 4 is a flow diagram showing a method of real-time prognosis of a flooding phenomenon in a packed column 400 according to yet another embodiment of the present disclosure. The method of real-time prognosis of the flooding phenomenon in the packed column 400 includes Step 410, Step 420, Step 430 and Step 440.

In Step 410, an online data collection step is conducted. In Step 420, a detrending step is conducted. In Step 430, a fitting step is conducted. Details of Step 410 to Step 430 can be the same as that of Step 110 to Step 130, and are not repeated herein.

In Step 440, a control step is conducted, wherein the value of the at least one of model coefficients is compared to a control limit, and an alarm is triggered when the value of the at least one of model coefficients is greater than the control limit. Moreover, the value of the at least one of model coefficients and the control limit can be plotted in a control chart. Therefore, it is favorable to directly monitor the flooding phenomenon of the packed column in real time via a graphic presentation.

In the embodiment, Step 440 can be implemented by an SPC method. In brief, in the method of real-time prognosis of the flooding phenomenon in the packed column 400, a plurality of values of the at least one of model coefficients are collected in advance, and the plurality of values of the at least one of model coefficients are analyzed to determine a control limit in advance. Afterward, the pre-determined control limit is applied to monitor the values of the at least one of model coefficients which are calculated online when the packed column is under operation, so that the flooding phenomenon inside the packed column can be monitored in real time. In the embodiment, the control limit in Step 440 can be determined based on a nonparametric SPC method using kernel density estimation (Hereinafter, KDE SPC method), and can be directly compared to the value of the at least one of model coefficients calculated online. Both of the KDE and the MW-test are suitable for the cases where the variable distribution information is lacking (in the present disclosure, the variable is the value of the at least one of model coefficients). However, the principle of the KDE is estimating the distribution by analyzing the sample of the variable, and the principle of the MW-test is transferring the unknown distribution into a known distribution by Formula (2). That's why an extra monitoring statistic calculated from Formula (2) is necessary for the MW-test, and an extra monitoring statistic is unnecessary for the KDE. Specifically, the KDE can estimate the distribution of the variable by Formula (5):

$$\hat{f}_h(x) = \frac{1}{nh} \sum_{i=1}^{n} K\left(\frac{x-x_i}{h}\right); \quad (5)$$

wherein $\hat{f}$ is a probability density function (PDF), $x_i$ is a data point in a training sample set, x is an arbitrary data point drawn from the same statistical distribution, h is a bandwidth, K is a kernel function, i is an integer from 1 to n, and n is the number of the data points $x_i$ in the training sample set.

The following outlines how to determine the control limit with the KDE SPC method. First, the PDF calculated from Formula (5) is integrated so as to obtain a cumulative distribution function (CDF). After the ARLo is determined, the control limit can be obtained by CDF. For example, when ARLo=500 (which means the probability of a normal data point (i.e., a data point collected when the process is in control) greater than the control limit is 0.2%), the value of x which makes the value of CDF equal to 99.8% is the control limit. How to calculate the control limit corresponding to a different ARLo has been discussed in relevant literature and is not described herein.

Figure 5:
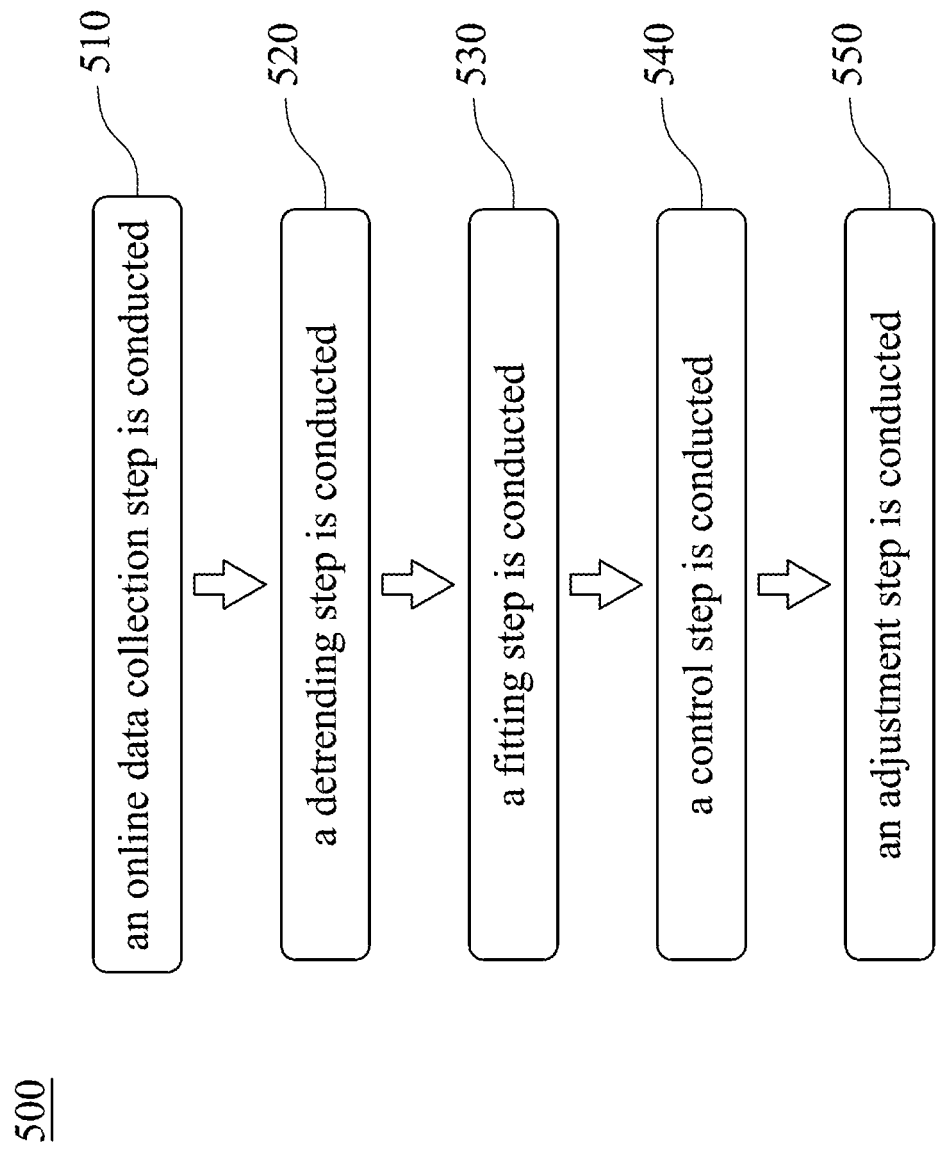
FIG. 5 is a flow diagram showing a method of real-time prognosis of a flooding phenomenon in a packed column according to further another embodiment of the present disclosure.

FIG. 5 is a flow diagram showing a method of real-time prognosis of a flooding phenomenon in a packed column 500 according to further another embodiment of the present disclosure. In FIG. 5, the method of real-time prognosis of the flooding phenomenon in the packed column 500 includes Step 510, Step 520, Step 530, Step 540 and Step 550.

In Step 510, an online data collection step is conducted. In Step 520, a detrending step is conducted. In Step 530, a fitting step is conducted. In Step 540, a control step is conducted. Details of Step 510 to Step 540 can be the same as that of Step 410 to Step 440, and are not repeated herein.

In Step 550, an adjustment step is conducted. Details of Step 550 can be the same as that of Step 370 in FIG. 3, and are not repeated herein.

According to the description of the above embodiments, in the method according to the present disclosure, a plurality of values of the at least one of model coefficients are collected in advance, and the plurality of values of the at least one of model coefficients are analyzed to determine a control limit in advance. Afterward, the pre-determined control limit is applied to monitor the values of the at least one of model coefficients which are calculated online when the packed column under operation, so that the flooding phenomenon of the packed column can be monitored in real time. In the method according to the present disclosure, due to the lack of the distribution information of the values of the at least one of model coefficients, the SPC methods suitable for the present disclosure are the SPC methods which are irrelevant to the distribution of the data, such as the nonparametric SPC methods. In the forgoing, both of the MW SPC method and the KDE SPC method are intended to be illustrative and are exemplary, thus the method according to the present disclosure is not limited thereto. As mentioned above, the at least one of model coefficients refers to the model coefficient whose values change significantly before and after the flooding phenomenon. Therefore, the SPC methods which can detect the change of the values of the at least one of model coefficients are all suitable for the present disclosure.

Moreover, in the method according to the present disclosure, the values of the pressure drop used to calculate the detrended pressure drop in the detrending step can be selected by a method of moving the time widow online (also called "a moving window method"). Specifically, in each time window, the values of the pressure drop are calculated to obtain a best-fit line with the least square method, and the values of the detrended pressure drop are obtained by simply subtracting the best-fit line from the values of the pressure drop, i.e., the linear trend is a partially linear trend which represents the linear trend in each time window. When the method of moving the time widow online is conducted, the size of the time window and the step length of the time window should be defined first. For example, when the size the time window is defined as 10 and the step length of the time window is defined as 2, which means 10 continuous values of the pressure drop are chosen as the calculating samples of the current time window, and the calculating interval between the current time window and the next time window is 2 values of the pressure drop. That is, the 10 continuous values of the pressure drop of the second time window start from the third pressure drop datum of the first time window, the 10 continuous values of the pressure drop of the third time window start from the fifth pressure drop datum of the first time window and so on. According to one example of the present disclosure, in the detrending step, the size of the time window is defined as 500, and the step length of the time window is defined as 25, which means 500 continuous values of the pressure drop are chosen as the calculating samples of the current time window, and the calculating interval between the current time window and the next time window is 25 values of the pressure drop. That is, the 500 continuous values of the pressure drop in the second time window start from the twenty-sixth pressure drop datum of the first time window and so on. With the method of moving the time widow online, the values of the detrended pressure drop in the current time window can be fitted with the EGARCH(p, q) model to obtain a set of values of the model coefficients, $\alpha_0$, $\beta_i$, $\alpha_j$ and $\xi_j$. Then move to the next time window according to the size and the step length, the values of the detrended pressure drop therein can be fitted with the EGARCH(p, q) model to obtain another set of values of the model coefficients, $\alpha_0$, $\beta_i$, $\alpha_j$ and $\xi_j$. Therefore, the set of values of the model coefficients, $\alpha_0$, $\beta_i$, $\alpha_j$ and $\xi_j$, in each of the time windows can be obtained. It is favorable for online calculating the values of the model coefficients, $\alpha_0$, $\beta_i$, $\alpha_j$ and $\xi_j$. More specifically, the values of the pressure drop are continuously collected online and recorded. By dividing the values of the pressure drop into different time widows to calculate the corresponding values of the model coefficients, $\alpha_0$, $\beta_i$, $\alpha_j$ and $\xi_j$, it is favorable for observing the changing trend of the pressure drop over time and is benefit to achieve the goal of real-time prognosis of the flooding phenomenon. There is a tradeoff between the accuracy and the monitor efficiency in the determination of the size of the time window. Specifically, an increased accuracy can be achieved by increasing the size of the time window, however, the monitor efficiency is decreased. Therefore, the size of the time window can be decided according to practical need.

Moreover, in the method according to the present disclosure, the calculating samples of the statistical step can also be selected by the method of moving the time widow online. According to one example of the present disclosure, in the statistical step, the size of the time window is defined as 5, and the step length of the time window is defined as 1, which means 5 continuous values of the at least one of model coefficients are chosen as the calculating samples of the current time window, and the calculating interval between the current time window and the next time window is 1 value of the at least one of model coefficients. With the method of moving the time widow online, the values of the at least one of model coefficients in the current time window are calculated to obtain a value of the monitoring statistic. Then move to the next time window according the size and the step length, the values of the at least one of model coefficients therein can calculated to obtain another value of the monitoring statistic and so on. Therefore, with the increased number of the values of the pressure drop collected online, the corresponding values of the monitoring statistic can be calculated for conducting the control step. Therefore, it is favorable for real-time prognosis of the flooding phenomenon.

EXAMPLES

Figure 6:
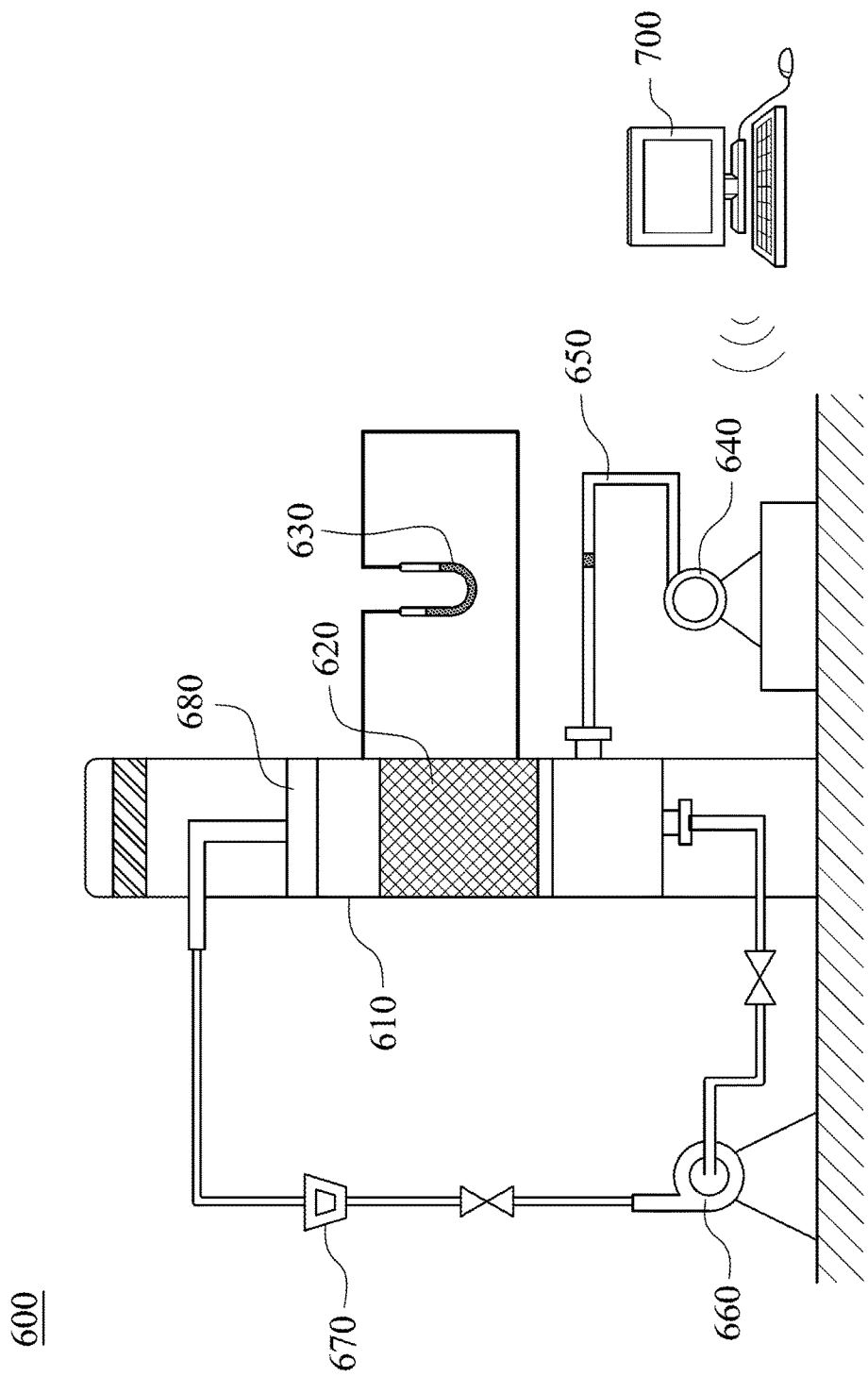
FIG. 6 is a schematic view of a packed column used in examples according to the present disclosure.

FIG. 6 is a schematic view of a packed column 600 used in the examples according to the present disclosure. Experiments are conducted with the packed column 600 to observe if the method according to the present disclosure can accurately predict the flooding phenomenon. The packed column 600 includes a column body 610, a packing layer 620, a sensing and transmitting element 630, a blower 640, an air inlet pipe 650, a liquid pump 660, a flowmeter 670 and a liquid distributor 680. The wall of the column body 610 is made of transparent glass, so that the flooding phenomenon can be directly observed by human eyes. When the packed column 600 is under operation, the gas (not shown) enters into the lower portion of the column body 610 from the air inlet pipe 650, then enters upwardly into the packing layer 620; the liquid (not shown) is pumped into the upper portion of the column body 610 by the liquid pump 660, and enters downwardly into the packing layer 620 after being distributed evenly by the liquid distributor 680. The sensing and transmitting element 630 is a differential pressure transmitter (EJA120, Yokogawa). The sensing and transmitting element 630, the blower 640 and the liquid pump 660 are connected with the computer 700 (via a wired or wireless connection). The values of the pressure drop measured by the sensing and transmitting element 630 can be delivered to the computer 700 by the sensing and transmitting element 630 in real time, and the values of the pressure drop are recorded by the computer 700. The blower 640 and the liquid pump 660 can change the operational condition of the packed column 600 according to an instruction of the computer 700. For example, the blower 640 can change the gas flow rate, and the liquid pump 660 can change the liquid flow rate. More specifically, the values of the pressure drop are measured and transferred into current signals of 4-20 mA by the sensing and transmitting element 630, and then be delivered through the wire to the input/output signal card (not shown) installed in the computer 700 based on the RS-485 communication, so that the values of the pressure drop can be recorded by the computer 700. Moreover, the instruction of the computer 700 can be delivered to the blower 640 and the liquid pump 660 through the wire so as to adjust the gas flow rate or the liquid flow rate. According to the present disclosure, the gas is air, and the liquid is water. Moreover, the experiments are conducted under normal temperature and pressure.

Example 1: a preflooding step is conducted before the formal experiment, i.e., let the flooding phenomenon occur in the packed column 600 and maintain for a period of time, so that the packings of the packing layer 620 can be soaked thoroughly, and the inaccuracy resulted from the incomplete soaking can be prevented. Afterward, the experiment is formally conducted. During the experiment, the liquid flow rate is approximately fixed at 0.88 m$^3$/h, the gas flow rate is increased continuously at a rate of 0.1 m$^3$/h per second, and the values of the pressure drop are measured by the sensing and transmitting element 630 with a frequency of 1200 times per minutes and are recorded by the computer 700. The experiment is conducted until the flooding phenomenon is observed by human eyes. In Example 1, the gas flow rate is in the range of 54-198.5 m$^3$/h, the flooding point is 148.0 m$^3$/h, and the sample number corresponding to the flooding point is 2243.

Example 2: the liquid flow rate is approximately fixed at 0.89 m$^3$/h, and other experimental conditions are the same as that of Example 1. In Example 2, the gas flow rate is in the range of 53-198.5 m$^3$/h, the flooding point is 153.6 m$^3$/h, and the sample number corresponding to the flooding point is 2619.

Figure 7:
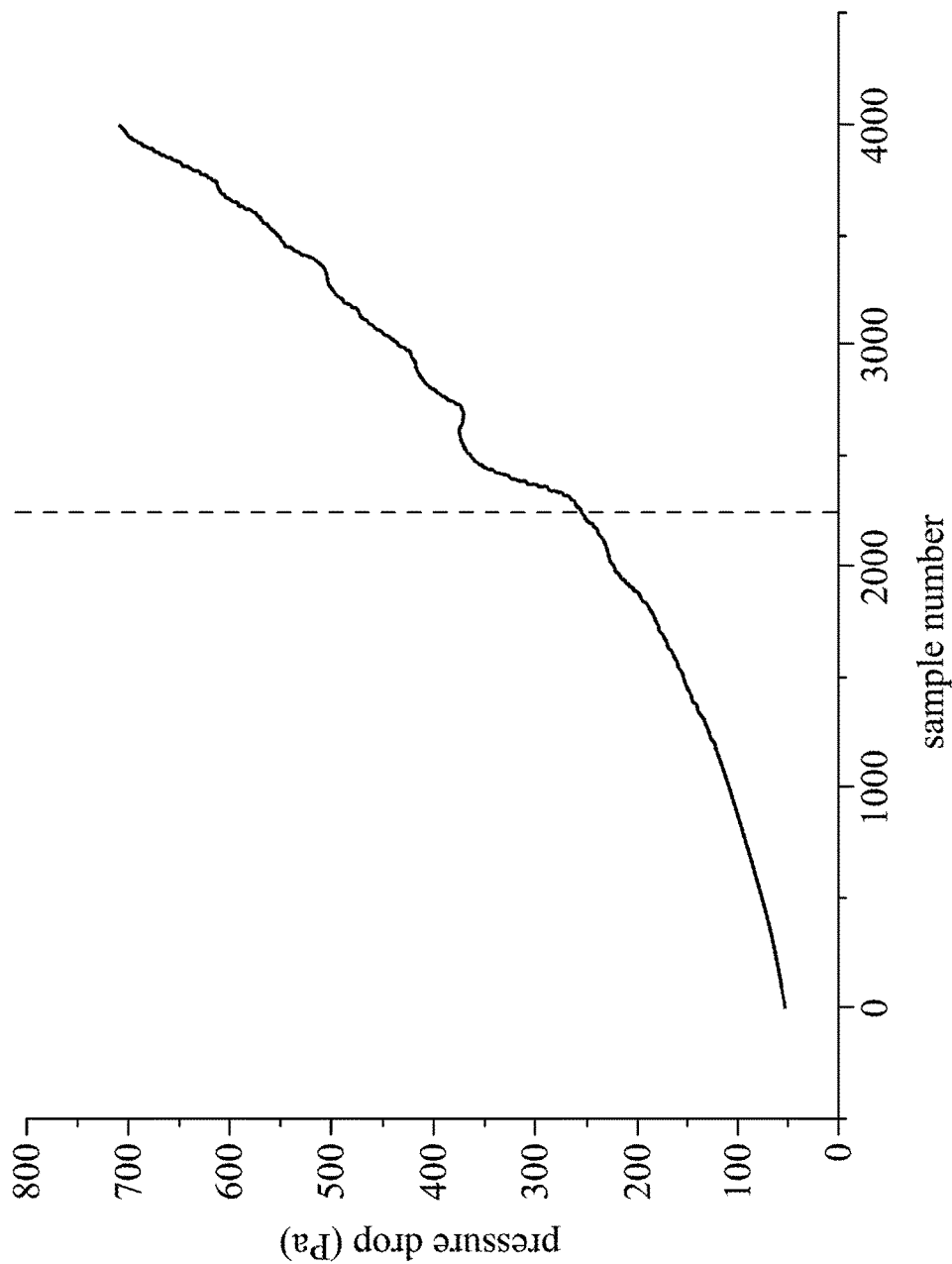
FIG. 7 is a diagram showing a trajectory of pressure drop in Example 1.
Figure 8:
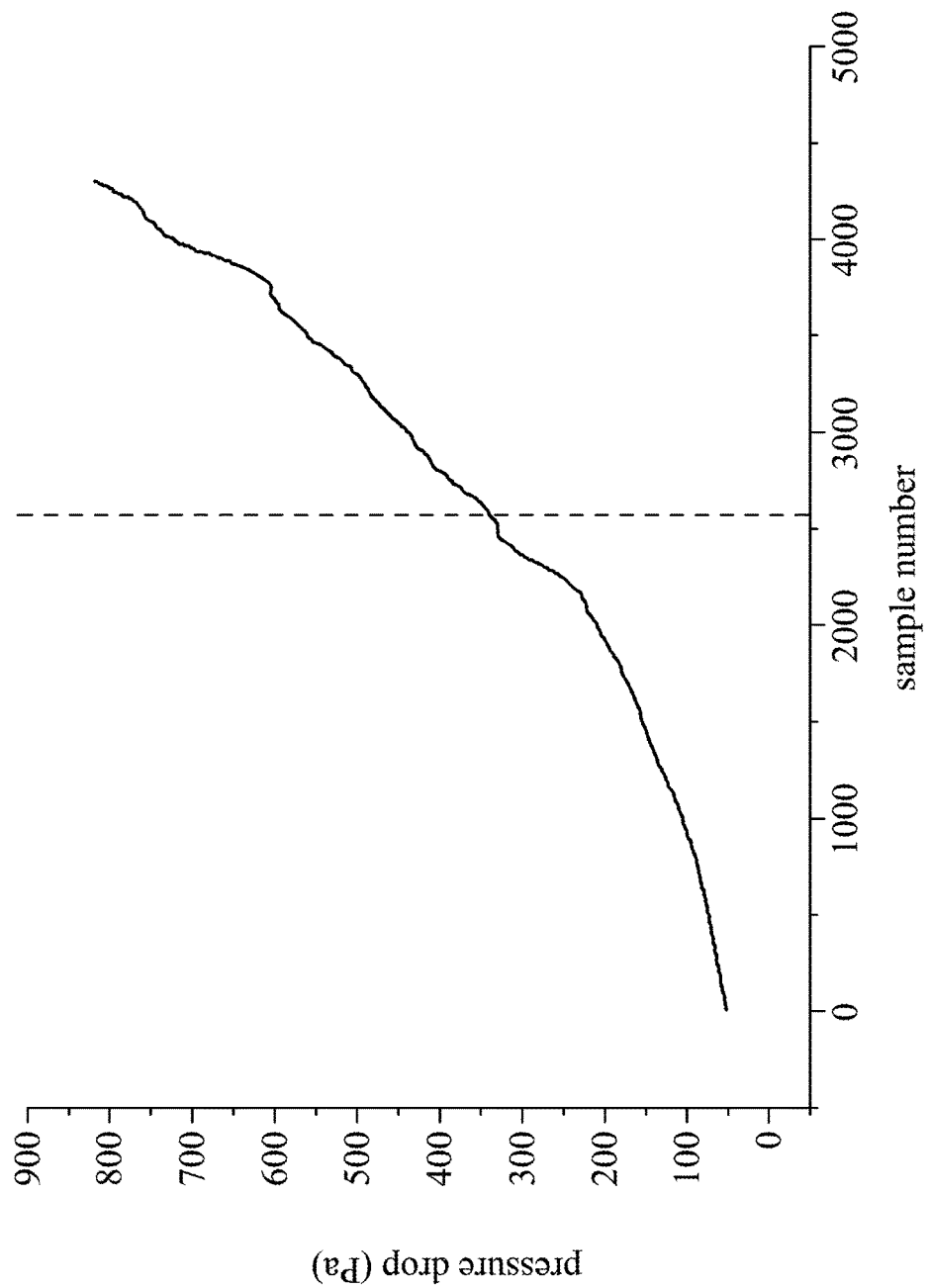
FIG. 8 is a diagram showing a trajectory of pressure drop in Example 2.

FIG. 7 is a diagram showing a trajectory of pressure drop in Example 1. FIG. 8 is a diagram showing a trajectory of pressure drop in Example 2. In FIG. 7 and FIG. 8, the dash line indicates the sample where the flooding phenomenon is firstly observed. As shown in FIG. 7 and FIG. 8, the pressure drop increases along with the increase of the gas flow rate, which shows that there is a rising trend in the time series of pressure drops, and the trend is required to be removed first.

Figure 9:
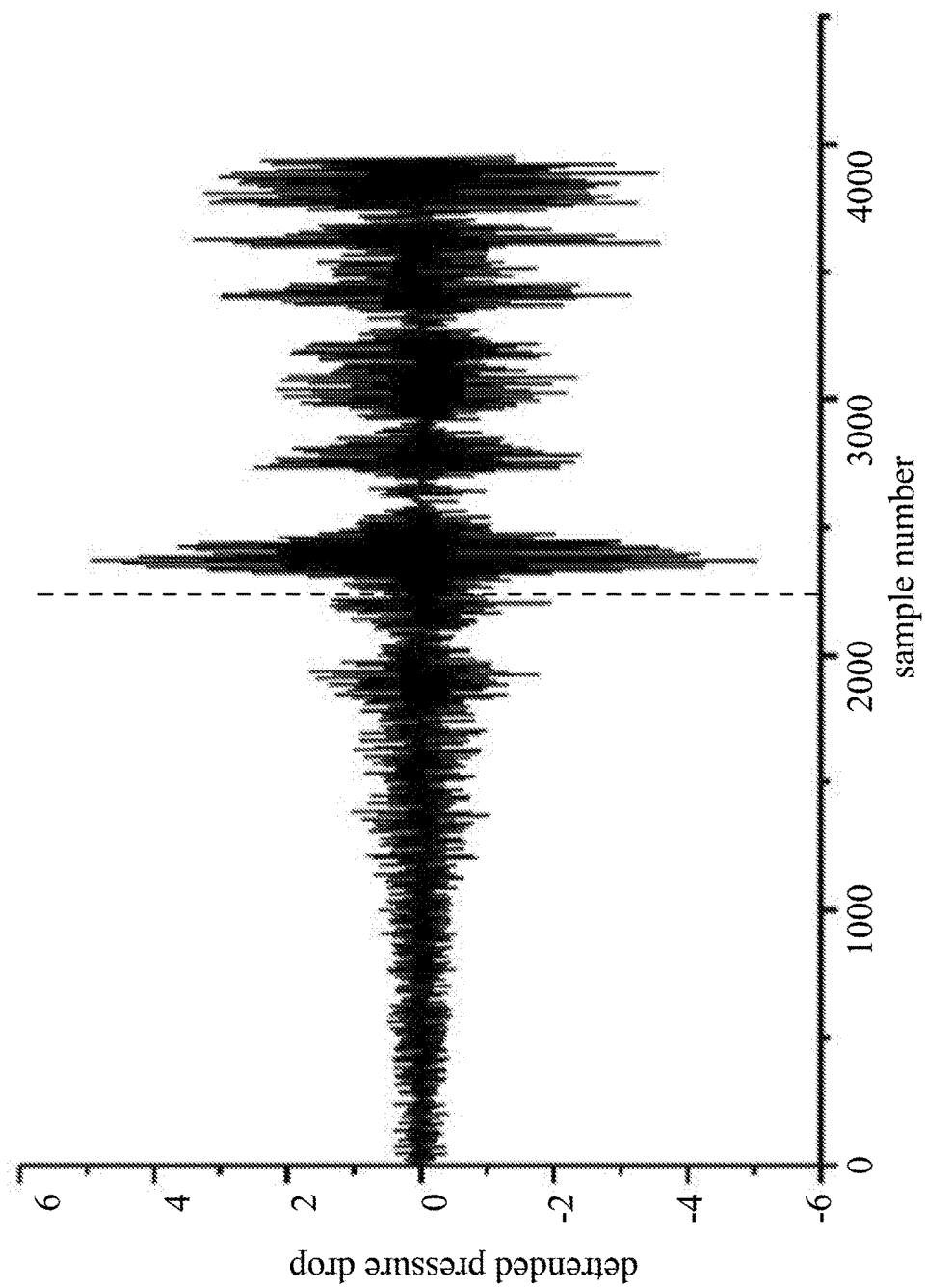
FIG. 9 is a diagram showing a trajectory of detrended pressure drop in Example 1.
Figure 10:
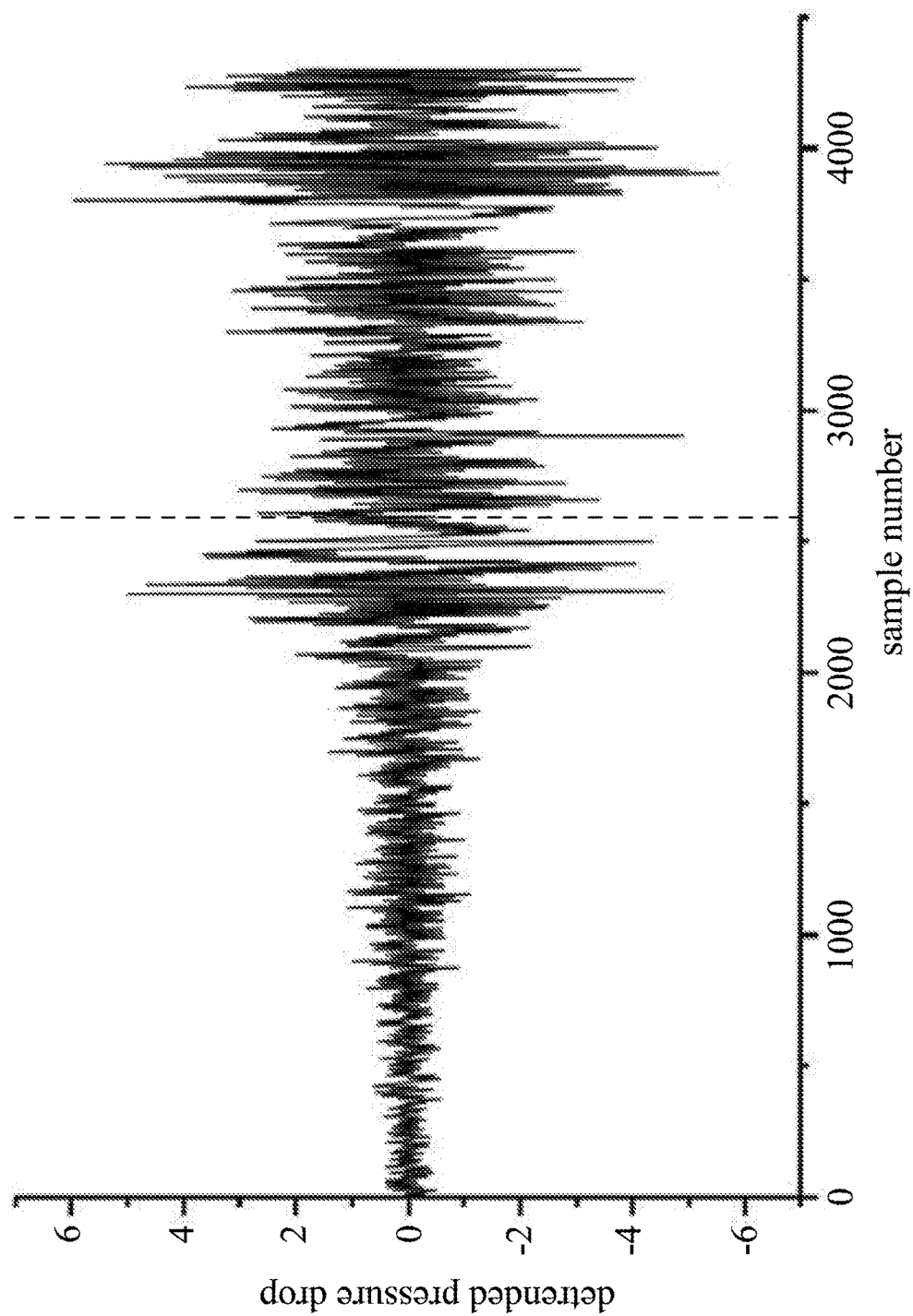
FIG. 10 is a diagram showing a trajectory of detrended pressure drop in Example 2.

The detrending step is conducted to remove the trend of the values of the pressure drop, in which the calculating samples are selected by the method of moving the time widow online. The size of the time window is defined as 500 and the step length of the time window is defined as 25. The trend of the values of the pressure drop in each time window is removed, in which a best-fit line of the values of the pressure drop in each time window is obtained with the least square method, and the values of the detrended pressure drop in each time window is obtained by simply subtracting the best-fit line from the values of the pressure drop in each time window. FIG. 9 is a diagram showing a trajectory of the detrended pressure drop in Example 1. FIG. 10 is a diagram showing a trajectory of the detrended pressure drop in Example 2. As shown in FIG. 7 to FIG. 10, when approaching the flooding point, the mean and variance of the values of the pressure drop fluctuate along with the change of the gas flow rate and liquid flow rate. Therefore, the operation of the packed column 600 violates the basic assumption of the conventional statistical process control method. Accordingly, the conventional statistical process control method is not applicable to establish the control limit and the control chart for the values of the pressure drop. However, in the method according to the present disclosure, the values of the pressure drop are first transformed into the model coefficients of the EGARCH(p, q) model, which allows the statistical process control method applicable to predict the flooding phenomenon in the packed column 600 in real time.

Figure 11:
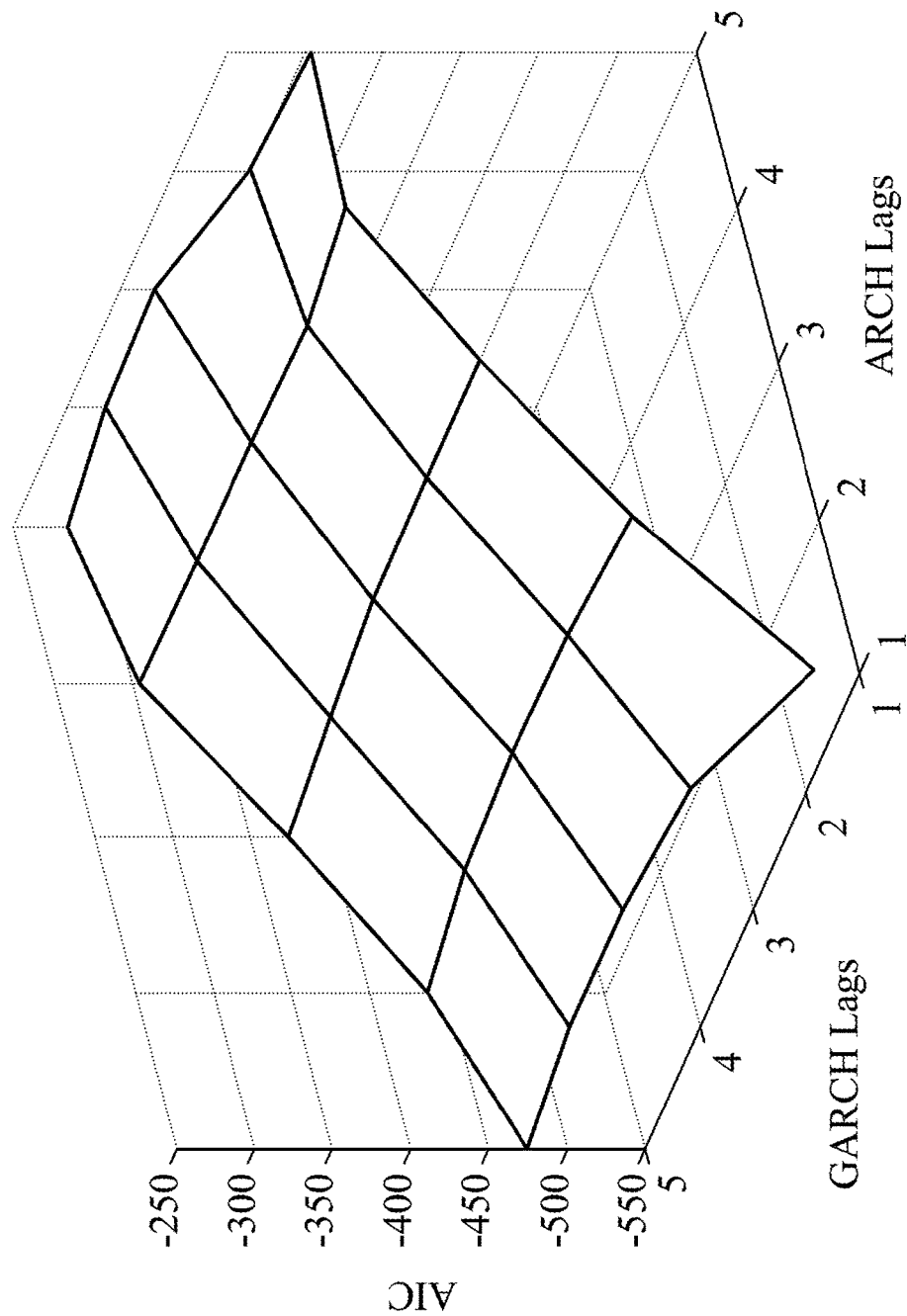
FIG. 11 shows an analysis result of AIC of the first time window in Example 2.
Figure 12:
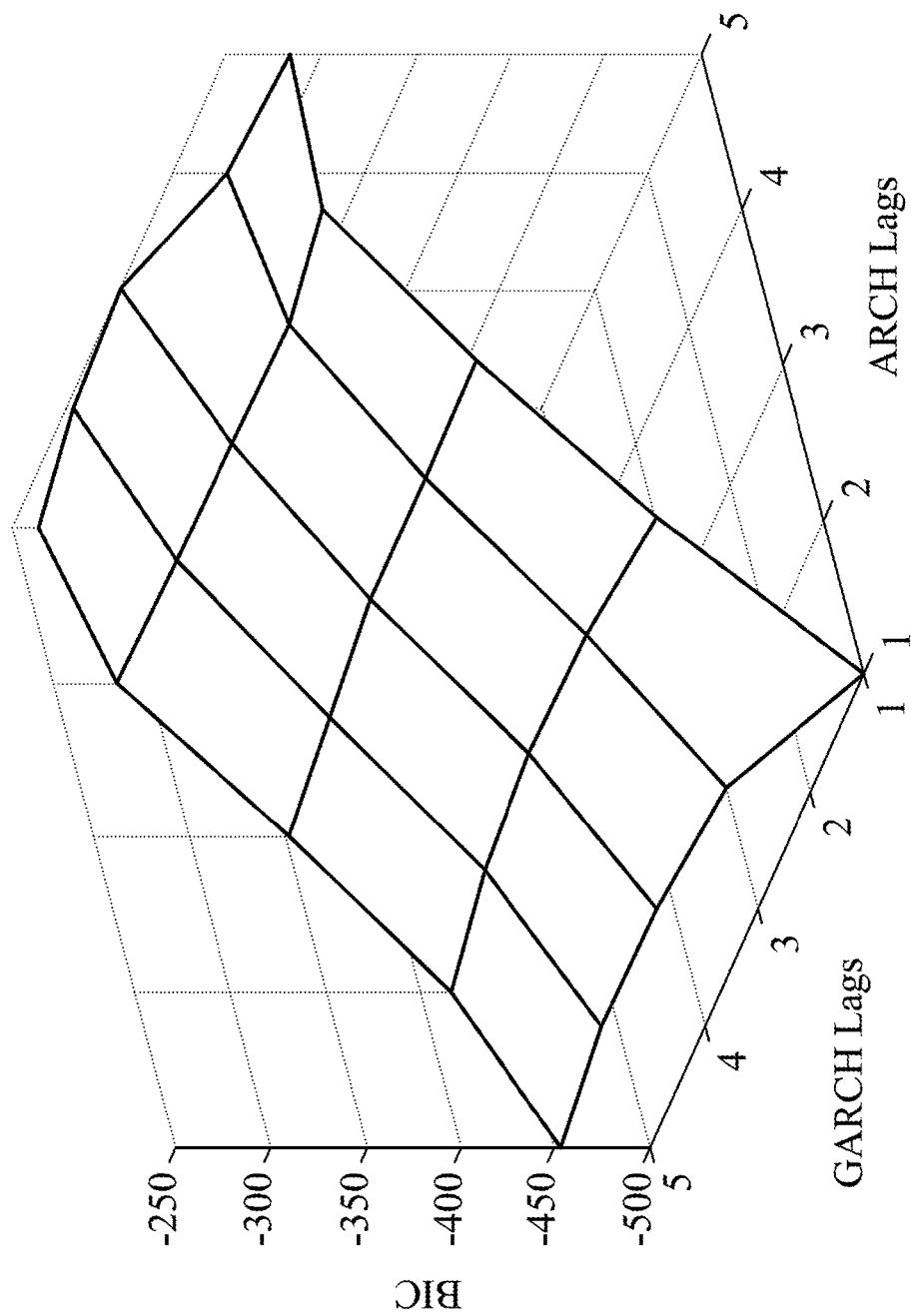
FIG. 12 shows an analysis result of BIC of the first time window in Example 2.

Before conducting the fitting step, the values of the detrended pressure drop in each time window is analyzed with the AIC or the BIC for determining the best values of the orders of the EGARCH(p, q) model, i.e., p and q. Herein, the orders of the EGARCH(p, q) model are identical to the lags of the EGARCH(p, q). Because of the limited length, only the analysis results of the first time window of Example 2 are recited herein. FIG. 11 shows an analysis result of AIC in the first window in Example 2. FIG. 12 shows an analysis result of BIC in the first window in Example 2. According to the analysis results of FIG. 11 and FIG. 12, p=1, and q=1 are decided to be the best values for the orders of the EGARCH(p, q) model. Moreover, in FIG. 11 and FIG. 12, GARCH is the abbreviation of generalized autoregressive conditional heteroskedasticity, and ARCH is the abbreviation of autoregressive conditional heteroskedasticity.

Figure 13:
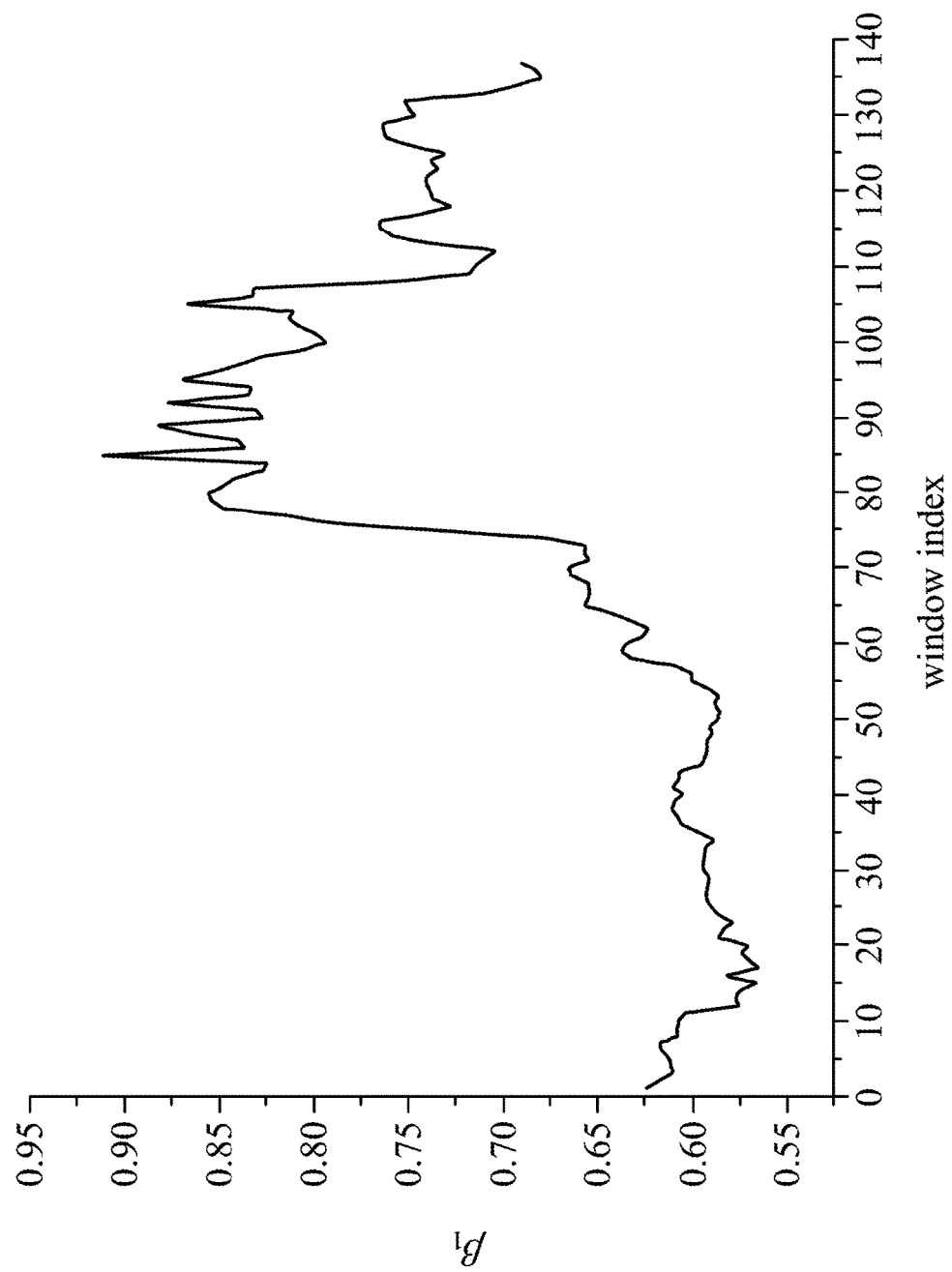
FIG. 13 shows values of $\beta_1$ in different time windows in Example 1.
Figure 14:
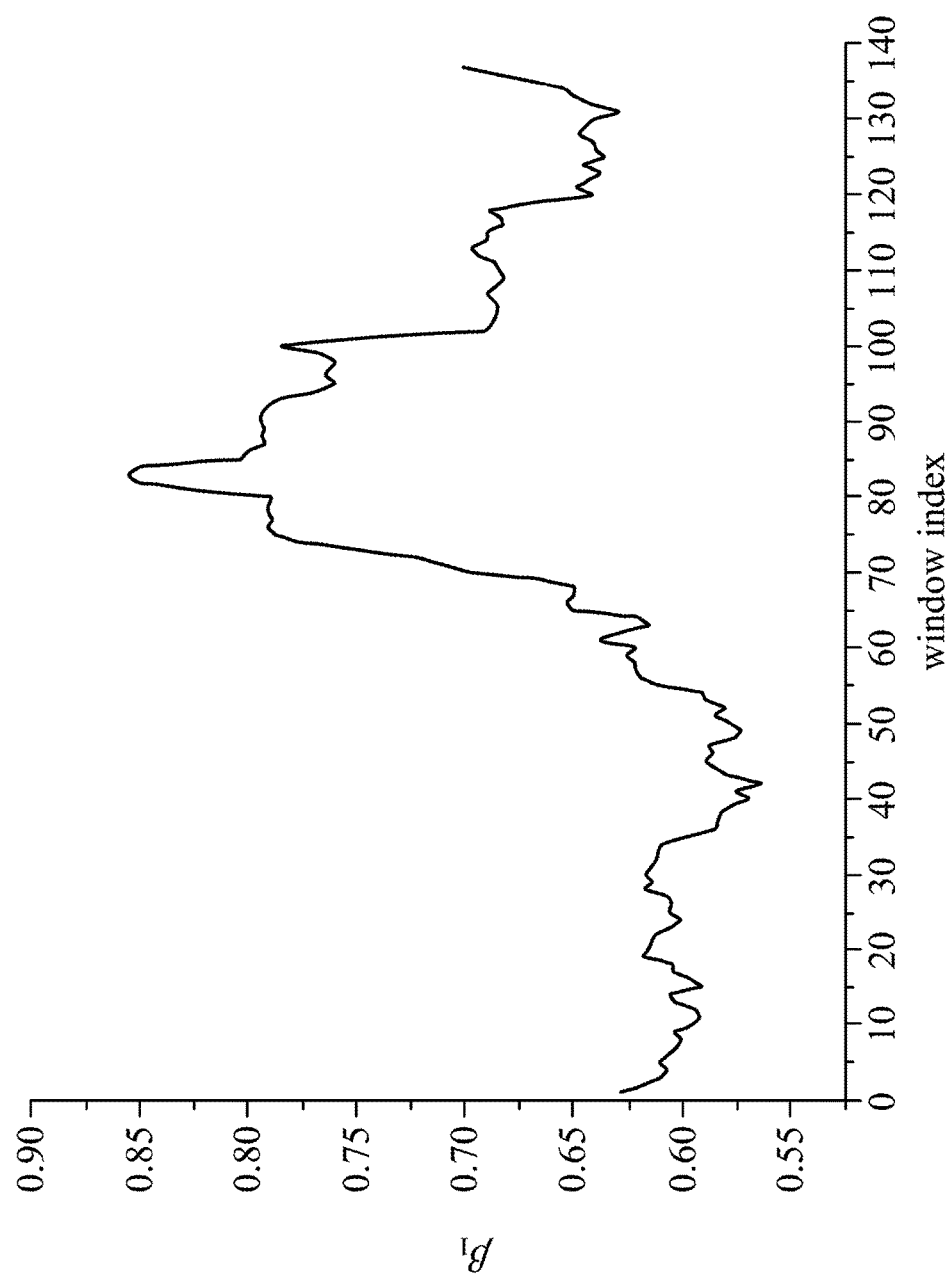
FIG. 14 shows values of $\beta_1$ in different time windows in Example 2.

After the analysis of AIC or BIC, the orders of the EGARCH(p, q) model in each time window are determined, i.e., p=1 and q=1. That is, the values of the detrended pressure drop in each time window are fitted with the EGARCH(1,1) model so as to obtain the model coefficients $\alpha_0$, $\beta_1$, $\alpha_1$ and $\xi_1$ in each time window. In the example, the real-time prognosis of the flooding phenomenon in a packed column is realized by monitoring the change of the values of $\beta_1$ in the time windows. Therefore, only the values of $\beta_1$ in the time windows are required to be recorded. FIG. 13 shows values of $\beta_1$ in different time windows of Example 1. FIG. 14 shows values of $\beta_1$ in different time windows of Example 2. As shown in FIG. 13 and FIG. 14, the values of $\beta_1$ change significantly when the flooding phenomenon is about to happen or is happening. That is, the value of $\beta_1$ can provide the information of the change of the pressure drop.

Figure 15:
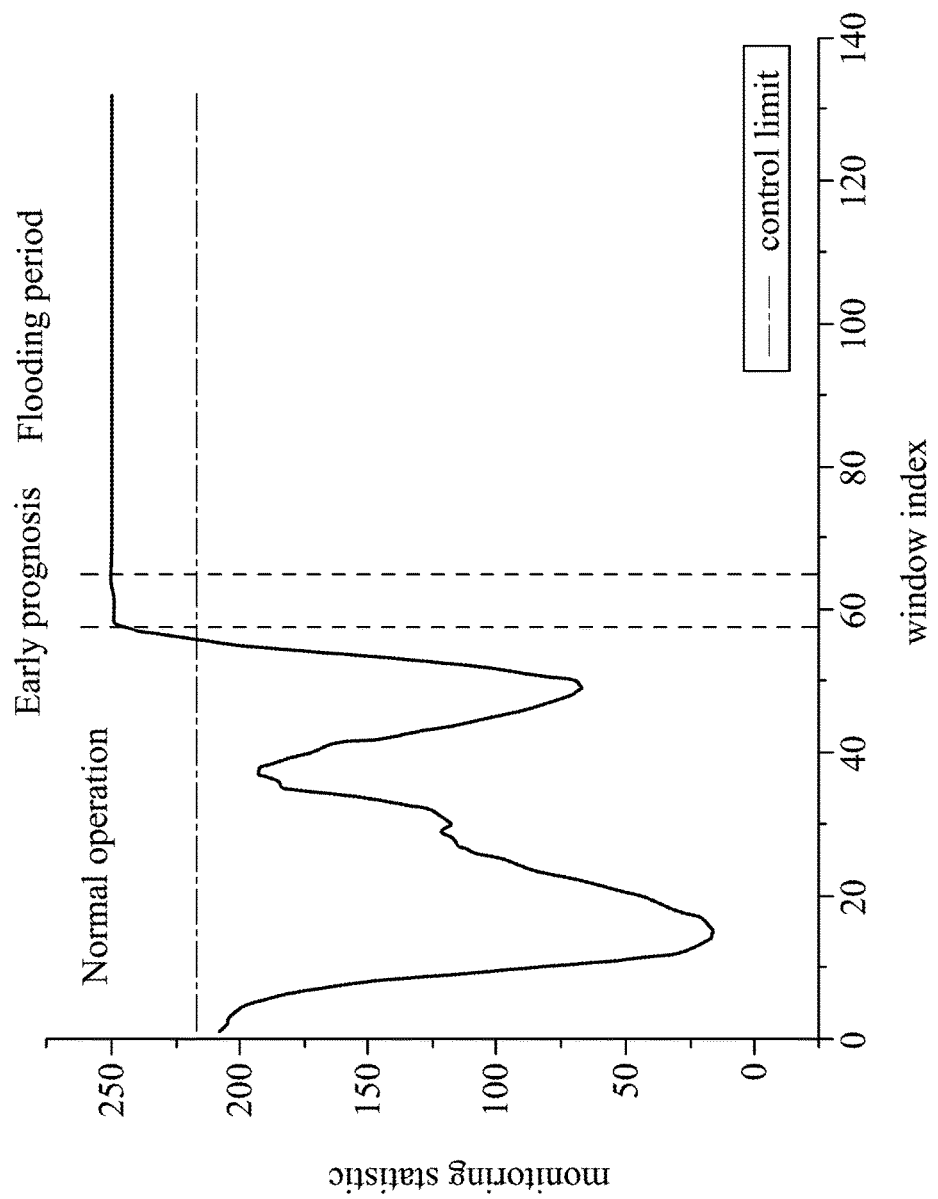
FIG. 15 is a control chart of Example 1 based on a nonparametric SPC method using Mann-Whitney test.
Figure 16:
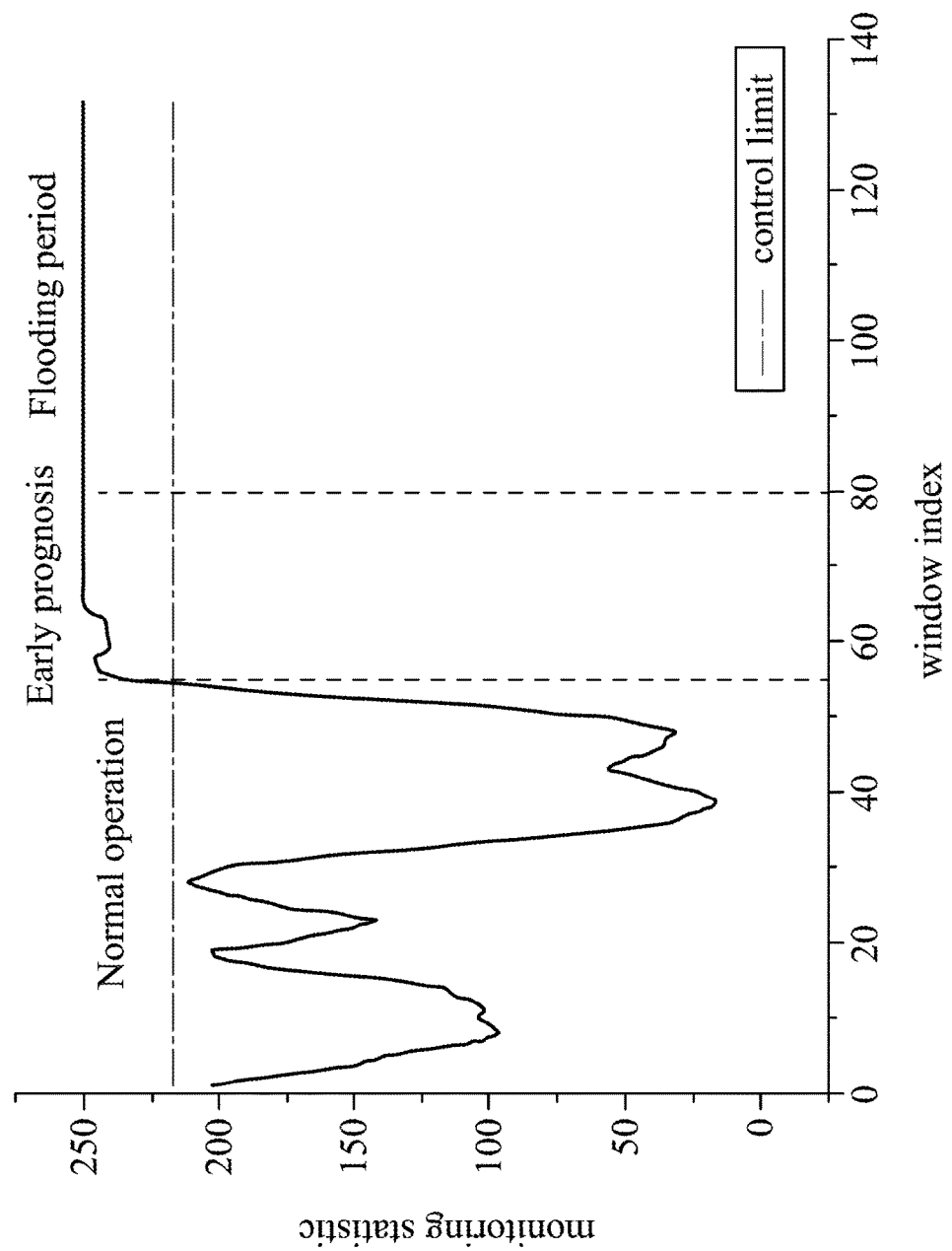
FIG. 16 is a control chart of Example 2 based on a nonparametric SPC method using Mann-Whitney test in Example 2.

Then, the control chart is plotted based on the MW SPC method. First, a training sample set and a control limit are provided. The training sample set are the values of $\beta_1$ in control. The control limit can be obtained as follows. The values of ARLo, m1 and m2 are first determined, which are: ARLo=500; m1=50; and m2=5. Thus, the control limit is 217, which is obtained by looking up Table 1. Afterward, the values of $\beta_1$ of Example 1 and Example 2 (i.e., the values of $\beta_1$ in FIG. 13 and FIG. 14) are calculated to obtain the value of the monitoring statistic by Formula (2), in which the method of calculating samples can be selected by the method of moving the time widow online, the size of the time window is defined as 5 (which equals to the size of the test sample set), the step length of the time window is defined as 1, then the value of the monitoring statistic of the values of $\beta_1$ in each time window is calculated. The control limit and the value of the monitoring statistic in each time windows are plotted in the control chart. FIG. 15 is the control chart of Example 1 based on a nonparametric SPC method using Mann-Whitney test Example 1, in which the vertical axis represents the monitoring statistic, and the horizontal axis represents the window index (the number of the time window). FIG. 16 is a control chart of Example 2 based on a nonparametric SPC method using the Mann-Whitney test, in which the vertical axis represents the monitoring statistic, and the horizontal axis represents the window index (the number of the time window). As shown in FIG. 15 and FIG. 16, when the packed column 600 is under normal operation, the values of the monitoring statistic are almost always lower than the control limit. When the flooding phenomenon is about to happen or when the flooding phenomenon is slight (corresponding to the stages of early prognosis in FIG. 15 and FIG. 16); alternatively, when the flooding phenomenon is obvious (corresponding to the stages of flooding period in FIG. 15 and FIG. 16), the values of the monitoring statistic are all higher than the control limit. It is clear that the method according to the present disclosure can effectively predict the flooding phenomenon in the packed column 600 in real time. Moreover, the control limit and the training sample set of Example 1 can directly apply to Example 2. That is, it is unnecessary to determine the control limit and collect the training sample set each time to use the method according to the present disclosure to predict the flooding phenomenon in packed columns, which is extremely convenient.

Figure 17:
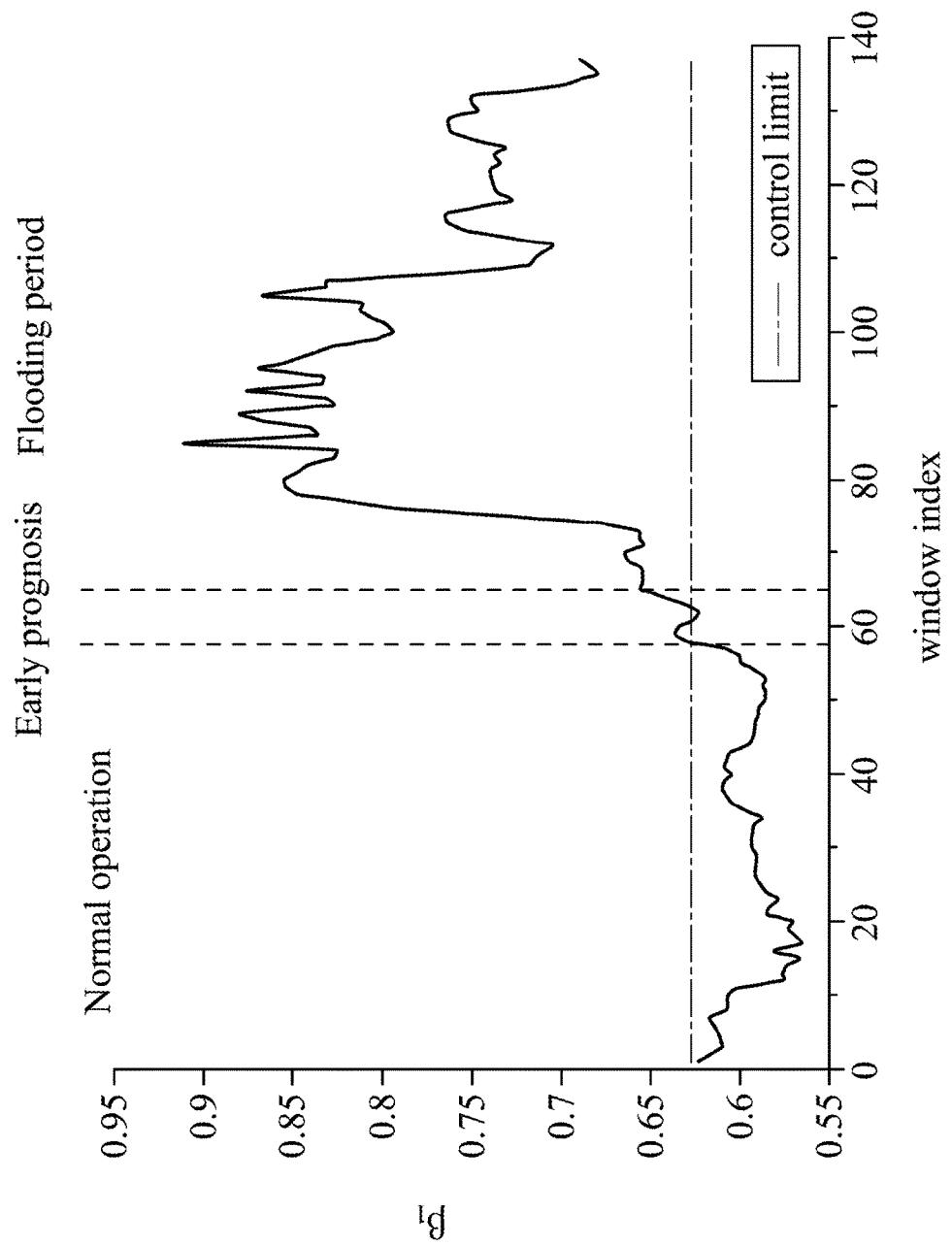
FIG. 17 is a control chart of Example 1 based on a nonparametric SPC method using kernel density estimation.
Figure 18:
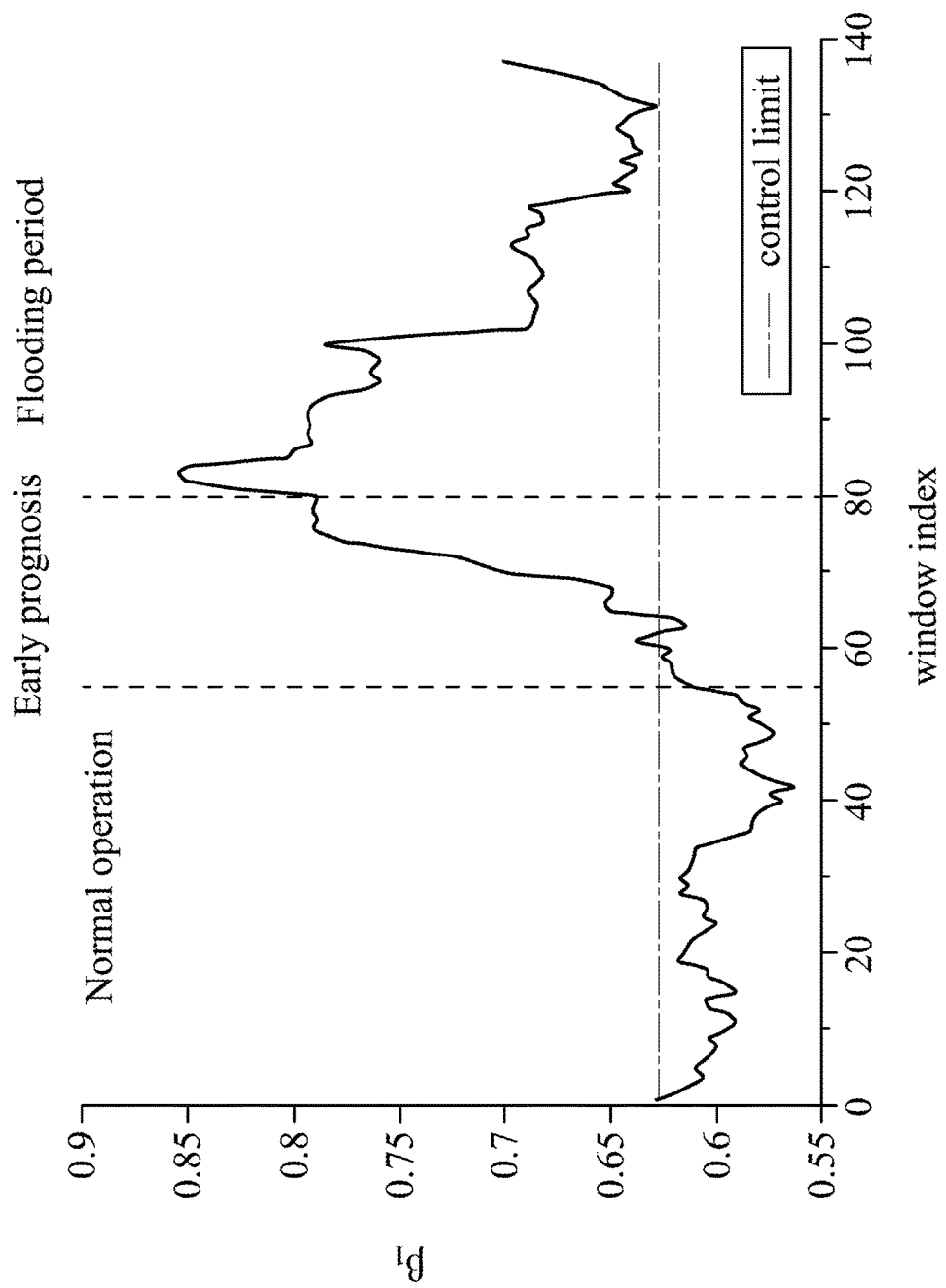
FIG. 18 is a control chart of Example 2 based on a nonparametric SPC method using kernel density estimation.

The values of $\beta_1$ in Example 1 and Example 2 can also be adopted to plot control charts according to the KDE SPC method. FIG. 17 is the control chart of Example 1 based on a nonparametric SPC method using kernel density estimation, in which the vertical axis represents $\beta_1$, and the horizontal axis represents the window index (the number of the time window). The control limit in FIG. 17 is 0.6276, which is obtained with ARLo=500. Both of the $\beta_1$ and the control limit are plotted in the control chart. FIG. 18 is the control chart of Example 2 based on a nonparametric SPC method using kernel density estimation, in which the vertical axis represents $\beta_1$, and the horizontal axis represents the window index (the number of the time window). The control limit in FIG. 18 is 0.6276, which is obtained with ARLo=500. Both the $\beta_1$ and the control limit are plotted in the control chart. As shown in FIG. 17 and FIG. 18, when the packed column 600 is under normal operation, the values of $\beta_1$ are lower than the control limit. When the flooding phenomenon in the packed column 600 is slight (corresponding to the stages of early prognosis in FIG. 17 and FIG. 18) or obvious (corresponding to the stages of flooding period in FIG. 17 and FIG. 18), the values of $\beta_1$ are all higher than the control limit. It is clear that the method according to the present disclosure can trigger an alarm when the flooding phenomenon is still slight (i.e., in the stage of early prognosis), the operational conditions of the packed column can be adjusted in time. Accordingly, the flooding phenomenon can be effectively prevented.

It should be stated that the examples of the present disclosure (Examples 1-2) are applied to prove that the method according to the present disclosure can predict slight flooding phenomenon and obvious flooding phenomenon. Therefore, in Examples 1-2, the gas flow rate is increased continuously until the obvious flooding phenomenon happens, and the phenomena observed by the eyes of engineer (i.e., the stages of "Normal operation", "Early prognosis"

and "Flooding period" labelled in FIGS. 15-18) are compared to the control limit and values of $\beta_1$ obtained by the method according to the present disclosure for assessing if the method according to the present disclosure can effectively predict the slight and the obvious flooding phenomenon. In other words, the examples of the present disclosure (Examples 1-2) are not the test results of the method according to the present disclosure, but the verification results of the effectivity of the method according to the present disclosure. In practice, when the method according to the present disclosure is applied to predict the flooding phenomenon in packed columns in real time, an alarm is triggered when the value of the monitoring statistic/model coefficient (such as $\beta_1$) is greater than the corresponding control limit, and the gas flow rate or liquid flow rate is adjusted immediately to prevent the flooding phenomenon. Therefore, the alarm is triggered before early prognosis, which can prevent the flooding phenomenon effectively.

To sum up, in the present disclosure, the values of the pressure drop are transformed into the model coefficients of the EGARCH(p, q) model, which enables the SPC method to be applied to the real-time prognosis of the flooding phenomenon in packed columns. As such, the slight flooding phenomenon can be predicted, and the operational conditions of the packed columns can be adjusted in time. Accordingly, the flooding phenomenon can be prevented. The method according to the present disclosure does not need a great number of empirical parameters, can be applied to various types of packed columns, and does not rely on human judgment. Therefore, the method according to the present disclosure is extremely practicable in industry.

Although the present disclosure has been described in considerable details with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of real-time prognosis of a flooding phenomenon in a packed column, comprising:
   conducting an online data collection step, wherein a plurality of values of a pressure drop are collected from the packed column under operation;
   conducting a detrending step, wherein a trend of the values of the pressure drop is removed to obtain a plurality of values of a detrended pressure drop;
   conducting a fitting step, wherein the values of the detrended pressure drop are fitted with an exponential generalized autoregressive conditional heteroskedasticity model with orders of p and q (EGARCH(p, q) model) to obtain a value of at least one of model coefficients;
   conducting a repeat step, wherein another value of the at least one of model coefficients is obtained;
   conducting a statistical step, wherein a value of the monitoring statistic is calculated based on the values of the at least one of model coefficients;
   conducting a control step, wherein the value of the monitoring statistic is compared to a control limit, and an alarm is triggered when the value of the monitoring statistic is greater than the control limit; and
   conducting an adjustment step after the alarm is triggered, wherein an operational condition of the packed column is adjusted to make the value of the monitoring statistic less than the control limit.

2. The method of real-time prognosis of the flooding phenomenon in the packed column of claim 1, wherein the EGARCH(p, q) model is represented by Formula (1):

$$\ln(\sigma_t^2) = \alpha_0 + \sum_{i=1}^{p} \beta_i \log \sigma_{t-i}^2 + \sum_{j=1}^{q} \alpha_j \left[ \frac{|\varepsilon_{t-j}|}{\sigma_j} - E\left\{ \frac{|\varepsilon_{t-j}|}{\sigma_{t-j}} \right\} \right] + \sum_{j=1}^{q} \xi_j \left( \frac{\varepsilon_{t-j}}{\sigma_{t-j}} \right); \quad (1)$$

wherein t is a time point, $\sigma_t^2$ is a conditional variance of pressure drop at the time point of t, $\alpha_0$, $\beta_i$, $\alpha_j$ and $\xi_j$ are the model coefficients, $\varepsilon_{i-j}$ is a residual, i is an integer from 1 to p, and j is an integer from 1 to q.

3. The method of real-time prognosis of the flooding phenomenon in the packed column of claim 1, further comprising repeating the repeat step before conducting the statistical step.

4. The method of real-time prognosis of the flooding phenomenon in the packed column of claim 1, wherein the p and the q of the EGARCH(p, q) model are determined based on an Akaike information criterion (AIC) or a Bayesian information criterion (BIC).

5. The method of real-time prognosis of the flooding phenomenon in the packed column of claim 1, wherein the p equals to 1, and the q equals to 1.

6. The method of real-time prognosis of the flooding phenomenon in the packed column of claim 1, wherein the online data collection step is implemented by measuring and delivering the values of the pressure drop to a computer via a sensing and transmitting element installed in the packed column, and the values of the pressure drop are recorded by the computer.

7. The method of real-time prognosis of the flooding phenomenon in the packed column of claim 6, wherein the packed column further comprises a blower and a liquid pump, and the blower change a gas flow rate and/or the liquid pump changes a liquid flow rate according to an instruction of the computer.

8. The method of real-time prognosis of the flooding phenomenon in the packed column of claim 1, wherein the trend of the values of the pressure drop is a linear trend, and the linear trend is obtained by fitting the values of the pressure drop with a least square method.

9. The method of real-time prognosis of the flooding phenomenon in the packed column of claim 1, wherein the value of the monitoring statistic and the control limit are obtained by a nonparametric statistical process control (SPC) method.

10. The method of real-time prognosis of the flooding phenomenon in the packed column of claim 9, wherein the nonparametric SPC method is a nonparametric SPC method using Mann-Whitney test.

11. The method of real-time prognosis of the flooding phenomenon in the packed column of claim 1, wherein, in the control step, the value of the monitoring statistic and the control limit are plotted in a control chart.

12. A method of real-time prognosis of a flooding phenomenon in a packed column, comprising:
   conducting an online data collection step, wherein a plurality of values of a pressure drop are collected from the packed column under operation;

conducting a detrending step, wherein a trend of the values of the pressure drop is removed to obtain a plurality of values of a detrended pressure drop;

conducting a fitting step, wherein the values of the detrended pressure drop are fitted with an exponential generalized autoregressive conditional heteroscedasticity model with orders of p and q (EGARCH(p, q) model, to obtain a value of at least one of model coefficients;

conducting a control step, wherein the value of at least one of model coefficients is compared to a control limit, and an alarm is triggered when the value of at least one of model coefficients is greater than the control limit; and conducting an adjustment step after the alarm is triggered, wherein an operational condition of the packed column is adjusted to make the value of at least one of model coefficients less than the control limit.

13. The method of real-time prognosis of the flooding phenomenon in the packed column of claim 12, wherein the EGARCH(p, q) model is represented by Formula (1):

$$\ln(\sigma_t^2) = \alpha_0 + \sum_{i=1}^{p} \beta_i \log \sigma_{t-i}^2 + \sum_{j=1}^{q} \alpha_j \left[ \frac{|\varepsilon_{t-j}|}{\sigma_j} - E\left\{ \frac{|\varepsilon_{t-j}|}{\sigma_{t-j}} \right\} \right] + \sum_{j=1}^{q} \xi_j \left( \frac{\varepsilon_{t-j}}{\sigma_{t-j}} \right); \quad (1)$$

wherein t is a time point, $\sigma_t^2$ is a conditional variance of pressure drop at the time point of t, $\alpha_0$, $\beta_i$, $\alpha_j$ and $\xi_j$ are the model coefficients, $\varepsilon_{t-j}$ is a residual, i is an integer from 1 to p, and j is an integer from 1 to q.

14. The method of real-time prognosis of the flooding phenomenon in the packed column of claim 12, wherein the p and the q of the EGARCH(p, q) model are determined based on an AIC or a BIC.

15. The method of real-time prognosis of the flooding phenomenon in the packed column of claim 12, wherein the p equals to 1, and the q equals to 1.

16. The method of real-time prognosis of the flooding phenomenon in the packed column of claim 12, wherein the trend of the values of the pressure drop is a linear trend, and the linear trend is obtained by fitting the values of the pressure drop with a least square method.

17. The method of real-time prognosis of the flooding phenomenon in the packed column of claim 12, wherein the value of at least one of model coefficients and the control limit are obtained by a nonparametric SPC method.

18. The method of real-time prognosis of the flooding phenomenon in the packed column of claim 17, wherein the nonparametric SPC method is a nonparametric SPC method using kernel density estimation.

19. The method of real-time prognosis of the flooding phenomenon in the packed column of claim 12, wherein, in the control step, the value of at least one of model coefficients and the control limit are plotted in a control chart.

* * * * *